United States Patent
Sakhnini et al.

(10) Patent No.: US 11,758,556 B2
(45) Date of Patent: Sep. 12, 2023

(54) UPLINK BEAM REFINEMENT BASED ON SOUNDING REFERENCE SIGNAL (SRS) WITH DYNAMIC PARAMETERS

(71) Applicant: QUALCOMM Incorporated, San Diego, CA (US)

(72) Inventors: Iyab Issam Sakhnini, San Diego, CA (US); Tao Luo, San Diego, CA (US); Wanshi Chen, San Diego, CA (US); Juan Montojo, San Diego, CA (US); Mahmoud Taherzadeh Boroujeni, San Diego, CA (US); Jelena Damnjanovic, Del Mar, CA (US); Olufunmilola Omolade Awoniyi-Oteri, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 155 days.

(21) Appl. No.: 17/325,058

(22) Filed: May 19, 2021

(65) Prior Publication Data
US 2021/0368482 A1    Nov. 25, 2021

Related U.S. Application Data

(60) Provisional application No. 63/029,068, filed on May 22, 2020.

(51) Int. Cl.
*H04L 5/00* (2006.01)
*H04W 72/04* (2023.01)
*H04W 72/23* (2023.01)
*H04W 72/044* (2023.01)
*H04W 88/08* (2009.01)

(52) U.S. Cl.
CPC .......... *H04W 72/23* (2023.01); *H04W 72/046* (2013.01); *H04W 88/08* (2013.01)

(58) Field of Classification Search
None
See application file for complete search history.

(56) References Cited

U.S. PATENT DOCUMENTS

| | | | |
|---|---|---|---|
| 10,972,244 B2 * | 4/2021 | Guo | H04B 7/0408 |
| 2018/0206132 A1 * | 7/2018 | Guo | H04B 7/0404 |
| 2018/0278467 A1 * | 9/2018 | John Wilson | H04W 72/21 |
| 2019/0081751 A1 * | 3/2019 | Miao | H04L 25/0224 |
| 2019/0199496 A1 * | 6/2019 | Qin | H04B 7/0617 |
| 2019/0207731 A1 * | 7/2019 | Park | H04B 7/0639 |

(Continued)

*Primary Examiner* — Duc T Duong
(74) *Attorney, Agent, or Firm* — Haynes and Boone, LLP/Qualcomm Incorporated

(57) ABSTRACT

Wireless communications systems and methods related to dynamically configuring sounding reference signal (SRS) resources are provided. In some aspects, a base station may measure a SRS transmission transmitted by a user equipment (UE) and receive, using a receive beam selected based on the measuring, a transmission from the UE. In some aspects, a UE may transmit a SRS transmission; and receive, from the BS, a downlink control information (DCI) message including a SRS resource indicator (SRI) for use by the UE in selecting a beam to transmit to the BS. The SRS transmission may be transmitted using a SRS resource and may have a SRS parameter that is indicated in or related to a triggering message, or related to a transmission parameter of a communication between the BS and the UE.

26 Claims, 9 Drawing Sheets

(56) References Cited

U.S. PATENT DOCUMENTS

| | | | |
|---|---|---|---|
| 2020/0044797 A1* | 2/2020 | Guo | H04W 72/21 |
| 2020/0107352 A1* | 4/2020 | Tsai | H04B 7/0617 |
| 2020/0235802 A1* | 7/2020 | Nilsson | H04L 25/0226 |
| 2020/0267571 A1* | 8/2020 | Park | H04W 72/0446 |
| 2020/0322893 A1* | 10/2020 | Yao | H04L 25/0226 |
| 2021/0105761 A1* | 4/2021 | Cheng | H04W 72/1289 |
| 2021/0144716 A1* | 5/2021 | Choi | H04L 5/0025 |
| 2021/0144720 A1* | 5/2021 | Xu | H04W 80/02 |
| 2021/0314931 A1* | 10/2021 | Farag | H04B 7/0695 |
| 2021/0337551 A1* | 10/2021 | Xia | H04W 52/0229 |
| 2021/0351884 A1* | 11/2021 | Huang | H04B 7/0404 |
| 2021/0377774 A1* | 12/2021 | Yu | H04W 12/08 |
| 2022/0022071 A1* | 1/2022 | Leather | H04B 7/0617 |
| 2022/0039122 A1* | 2/2022 | Park | H04W 74/0841 |
| 2022/0052742 A1* | 2/2022 | Huang | H04L 5/0091 |
| 2022/0116182 A1* | 4/2022 | Shi | H04B 7/0695 |
| 2022/0123815 A1* | 4/2022 | Karjalainen | H04W 24/10 |
| 2022/0123898 A1* | 4/2022 | Shi | H04W 52/08 |
| 2022/0217590 A1* | 7/2022 | Guo | H04W 36/0072 |
| 2022/0217654 A1* | 7/2022 | Kang | H04W 52/242 |
| 2022/0248385 A1* | 8/2022 | Cha | H04W 48/10 |
| 2022/0263621 A1* | 8/2022 | Cha | H04W 52/242 |
| 2022/0264324 A1* | 8/2022 | Guo | H04L 5/0078 |
| 2022/0330045 A1* | 10/2022 | He | H04L 5/0091 |
| 2022/0330167 A1* | 10/2022 | Chen | H04W 52/42 |
| 2022/0393823 A1* | 12/2022 | Fan | H04L 5/0048 |
| 2023/0010532 A1* | 1/2023 | Matsumura | H04W 52/58 |
| 2023/0127256 A1* | 4/2023 | Cha | H04W 52/242 |
| | | | 370/318 |

* cited by examiner

UPLINK BEAM REFINEMENT BASED ON SOUNDING REFERENCE SIGNAL (SRS) WITH DYNAMIC PARAMETERS

CROSS-REFERENCE TO RELATED APPLICATIONS

The present application claims priority to and the benefit of the U.S. Provisional Patent Application No. 63/029,068, filed May 22, 2020, titled "Uplink Beam Refinement Based on Sounding Reference Signal (SRS) with Dynamic Parameters," which is hereby incorporated by reference in its entirety as if fully set forth below and for all applicable purposes.

TECHNICAL FIELD

This application is directed to wireless communication systems and methods.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices (e.g., user equipment (UE)).

To meet the growing demands for expanded mobile broadband connectivity, wireless communication technologies are advancing from the long term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum.

NR may allow for channel quality measurements and beam management with the use of sounding reference signals (SRSs) that are transmitted by UEs and received by BSs. A BS to which a UE is attached may schedule the transmission of the SRSs by the UE and further indicate to the UE the resources that the UE may use in transmitting the SRSs. In some cases, the BS may configure the resources to be used for transmitting the SRSs. The BS may then use these SRSs, for example, for uplink (UL) beam refinements to identify a preferred receive (RX) beam and to aid the UE to identify a preferred transmit (TX) beam.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Some aspects of the present disclosure disclose a method of wireless communication performed by a base station (BS). In some aspects, the method comprises measuring a sounding reference signal (SRS) transmission transmitted by a user equipment (UE) using a SRS resource, the SRS transmission having a SRS parameter that is (i) indicated in or related to a triggering message, or (ii) related to a transmission parameter of a communication between the BS and the UE. Further, the method comprises receiving, using a receive beam selected based on the measuring, a transmission from the UE.

Some aspects of the present disclosure disclose a method of wireless communication performed by a user equipment (UE). In some aspects, the method comprises transmitting to a base station (BS) a sounding reference signal (SRS) transmission using a SRS resource and having a SRS parameter that is (i) indicated in or related to a triggering message, or (ii) related to a transmission parameter of a communication between the UE and the BS. Further, the method comprises receiving, from the BS, a downlink control information (DCI) message including a SRS resource indicator (SRI) for use by the UE in selecting a beam to transmit to the BS.

Some aspects of the present disclosure disclose a base station (BS), comprising: a memory; a processor coupled to the memory; and a transceiver coupled to the processor. In some aspects, the processor may be configure to: measure a sounding reference signal (SRS) transmission transmitted by a user equipment (UE) using a SRS resource, the SRS transmission having a SRS parameter that is (i) indicated in or related to a triggering message, or (ii) related to a transmission parameter of a communication between the BS and the UE. Further, the transceiver may be configured to receive, using a receive beam selected based on the measuring, a transmission from the UE.

Some aspects of the present disclosure disclose a user equipment (UE), comprising: a memory; a processor coupled to the memory; and a transceiver coupled to the processor. In some aspects, the transceiver may be configured to transmit to a base station (BS) a sounding reference signal (SRS) transmission using a SRS resource and having a SRS parameter that is (i) indicated in or related to a triggering message, or (ii) related to a transmission parameter of a communication between the UE and the BS. Further, the transceiver may be configured to receive, from the BS, a downlink control information (DCI) message including a SRS resource indicator (SRI) for use by the UE in selecting a beam to transmit to the BS.

Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments it should be understood that

DETAILED DESCRIPTION

Figure 1:
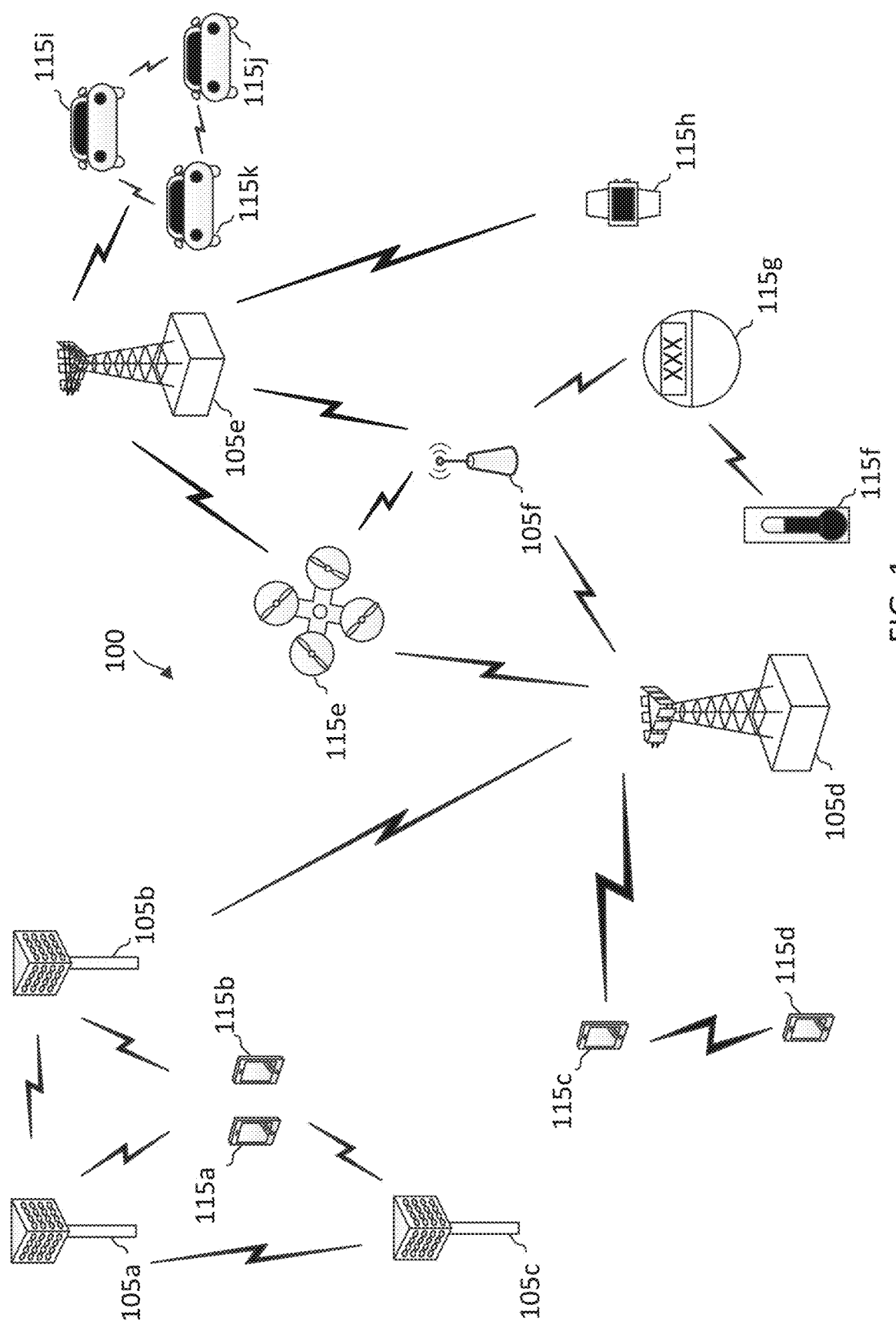
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, 5$^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a Ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

A 5G NR communication system may be implemented to use optimized OFDM-based waveforms with scalable numerology and transmission time interval (TTI). Additional features may also include having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink (UL)/downlink (DL) scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and DL to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

In a certain wireless communication network, a BS may configure parameters of the SRS semi-statically, i.e., via RRC messages. Semi-static SRS configurations may constrain the flexibility of beam management procedures, however, because SRS resources that are used to transmit SRSs that include SRS parameters may be triggered dynamically and the static SRS parameter configurations may be in conflict with the dynamic aspect of the triggering of the SRS resources. For example, a semi-statically configured bandwidth of an SRS may too large in comparison to the bandwidth of an upcoming UL or DL transmission, and it may be desirable to relate the bandwidth of the SRS to that of the upcoming transmission or the bandwidth of the SRS triggering transmission. As such, it may be desirable to adjust SRS parameters for SRS transmissions dynamically by, for example, relating these parameters dynamically with the corresponding parameters of the triggering DL transmission or some other UL or DL transmission.

Aspects of the present disclosure can provide several benefits. For example, as noted above, the capability to dynamically adjust or configure the parameters of the SRS provides flexibility when one executes procedures that use the SRSs, such as beam refinement procedures performed by BSs. For instance, as discussed below, if the timing or slot offset between a SRS triggering transmission such as a DCI transmission and a the SRS transmission is semi-statically configured (i.e., configured via a RRC message), then for beam refinement of an upcoming UL or DL transmission to occur, the timing of that UL or DL transmission may have to exceed the timing or slot offset, limiting the flexibility of the BS to perform beam management or refinement based on the SRS transmission. By having the timing or slot offset of the SRS be dynamically related to the timing of the UL or DL transmission, however, beam refinement based on the SRS transmission can be facilitated for a wider range of DL or UL transmission timing. Further, such control or flexibility improves the efficient use of network resources. For example, by tailoring the SRS bandwidth to the bandwidth of the DL or UL transmission, network resources devoted to procedures that use SRSs such as beam management procedures may be more efficiently utilized. Accordingly, the present disclosure can support or facilitate beam management or refinement using SRS resources.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 may be dispersed throughout the wireless network 100, and each UE 115 may be stationary or mobile. UEs can take in a variety of forms and a range of form factors. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-step-size configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as V2V, V2X, C-V2X communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. The random access procedure (or RACH procedure) may be a single or multiple step process. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a backoff indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. Scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the BS 105 may engage in beam management procedures with UE 115 to acquire and maintain a suitable set of beams for communication between BS 105 and UE 115. For example, beam management procedures may include beam determination procedures where suitable beams are identified and selected at the BS 105 or the UE 115 based on evaluations of beam quality. To assist the BS 105 and/or the UE 115 in determining identifying and selecting suitable beams for communication, the BS 105 may configure each UE 115 to sound one or more transmit antenna ports of the respective UE 115. Sounding may refer to the transmission of an SRS via one or more antenna ports. The SRS may include a waveform sequence (e.g., predetermined) that are known to the BS 105 and the UE 115. For instance, the SRS may be Zadoff-Chu sequence or any suitable waveform sequence. In some instances, a transmit antenna port at a UE 115 may map to a physical transmit antenna element of the UE 115. In some other instances, a transmit antenna port at a UE 115 may be a virtual antenna port or a logical port created by the UE 115, for example, via precoding. Precoding may include applying different amplitude weights and/or different phased adjustments to signals output by the physical transmit antenna elements of the UE 115 to produce a signal directed towards a certain spatial direction. In some aspects, the network 100 may operate in a TDD mode. The BS 105 may also estimate DL channel characteristics from UL SRSs received from the UEs 115 based on TDD channel reciprocity.

In some aspects, the BS 105 may configure parameters of the SRS semi-statically, i.e., via RRC messages. In some instances, however, semi-static SRS configurations may limit or constrain the beam management procedures, because some types of SRS may be triggered dynamically (while the parameters of the SRS are configured semi-statically, for example). For example, a semi-statically configured bandwidth of a dynamically triggered SRS may be limited by the narrower bandwidth of some NR devices, such as so-called RedCap devices with reduced capability configured primarily to transmit UL transmissions (industrial sensors, etc.). As such, it may be desirable to adjust SRS parameters for SRS transmissions dynamically. Mechanisms to configure SRS parameters dynamically and perform beam management including beam refinement based on SRS having dynamically configured parameters are described in greater detail herein.

Figure 2:
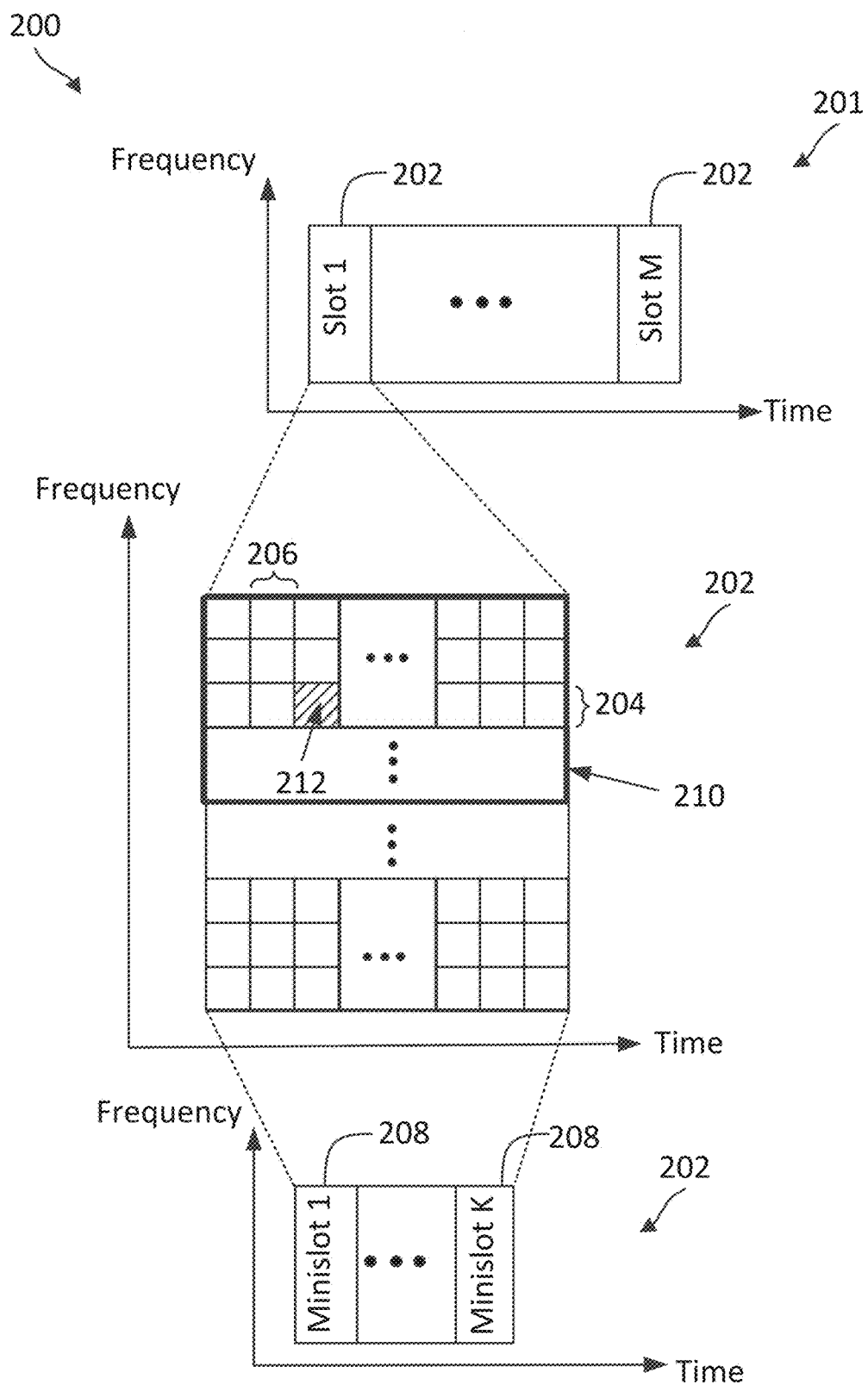
FIG. 2 illustrates a radio frame structure according to some aspects of the present disclosure.

FIG. 2 illustrates a radio frame structure 200 according to some aspects of the present disclosure. The radio frame structure 200 may be employed by BSs such as the BSs 105 and UEs such as the UEs 115 in a network such as the network 100 for communications, for example, for the transmission of SRS from the UEs to the BSs. In particular, the BS may communicate with the UE using time-frequency resources configured as shown in the radio frame structure 200. In FIG. 2, the x-axes represent time in some arbitrary units and the y-axes represent frequency in some arbitrary units. The transmission frame structure 200 includes a radio frame 201. The duration of the radio frame 201 may vary depending on the aspects. In an example, the radio frame 201 may have a duration of about ten milliseconds. The radio frame 201 includes M number of slots 202, where M may be any suitable positive integer. In an example, M may be about 10.

Each slot 202 includes a number of subcarriers 204 in frequency and a number of symbols 206 in time. The number of subcarriers 204 and/or the number of symbols 206 in a slot 202 may vary depending on the aspects, for example, based on the channel bandwidth, the subcarrier spacing (SCS), and/or the cyclic prefix (CP) mode. One subcarrier 204 in frequency and one symbol 206 in time forms one resource element (RE) 212 for transmission. A resource block (RB) 210 is formed from a number of consecutive subcarriers 204 in frequency and a number of consecutive symbols 206 in time. Each slot 202 may be time-partitioned into K number of mini-slots 208. Each mini-slot 208 may include one or more symbols 206. The mini-slots 208 in a slot 202 may have variable lengths. For example, when a slot 202 includes N number of symbols 206, a mini-slot 208 may have a length between one symbol 206 and (N−1) symbols 206. In some aspects, a mini-slot 208 may have a length of about two symbols 206, about four symbols 206, or about seven symbols 206. In some examples, the BS may schedule UE at a frequency-granularity of a resource block (RB) 210 (e.g., including about 12 subcarriers 204). In an example, a BS (e.g., BS 105 in FIG. 1) may schedule a UE (e.g., UE 115 in FIG. 1) for UL and/or DL communications at a time-granularity of slots 202 or mini-slots 208.

In some aspects, a SRS may span one, two or four consecutive symbols and may be located within the last six symbols of a slot (i.e., in the time domain of the radio frame structure 200 that includes the time and frequency resources). In the frequency domain, an SRS may have a "comb" structure, i.e., the SRS may be transmitted on every second subcarrier ("comb-2") or fourth ("comb-4") subcarrier. In some aspects, SRS transmissions from different devices may be frequency multiplxed within the same frequency range by assigning different combs corresponding to different frequency offsets. For example, for "comb-2" and for "comb-4", two SRSs and up to four SRSs, respectively, can be frequency multiplexed.

Figure 3:
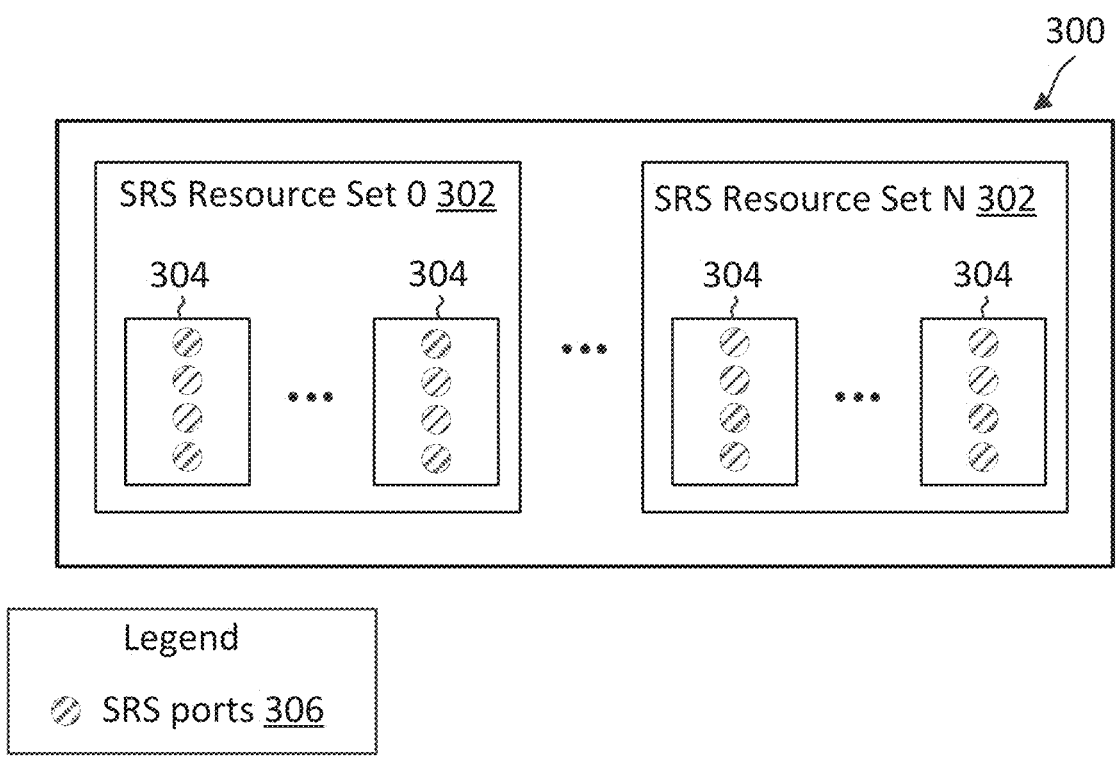
FIG. 3 illustrate example configuration of a UE with one or more SRS resource sets according to some aspects of the present disclosure.

FIG. 3 illustrates example configuration of a UE with one or more SRS resource sets according to some aspects of the present disclosure. The configuration 300 includes a plurality of SRS resource sets 302 (shown as SRS resource set 0 to SRS resource set N), each SRS resource set 302 including one or more SRS resources 304, i.e., one or more configured SRSs. Each SRS resource 304 may include time-frequency resources. For instance, each SRS resource 304 may span one or more symbols (e.g., the symbols 206) within a slot (e.g., the slot 202) and may include one or more subcarriers (e.g., the subcarriers 204) or REs (e.g., the REs 212) within each SRS symbol. Additionally, each SRS resource 304 may be configured with one or more SRS ports 306 (e.g., up to four SRS ports). For instance, each SRS port 306 may be associated with one or more REs within an SRS symbol. A UE 304 may transmit an SRS via a transmit antenna port, and the SRS can assist the BS 302 in performing beam management procedures including beam refinement, facilitating communication with the UE 304.

In some aspects, each SRS resource set 302 may be associated with a certain resource type. For example, an SRS resource set 302 may have a resource type of periodic, semi-persistent, or aperiodic. An SRS resource set 302 with a periodic resource type may have a configured periodicity and each periodic SRS resource 304 may have a configured symbol offset within a slot. A UE 304 may utilize a periodic SRS resource 304 for periodic SRS transmission. An SRS resource set 302 with a semi-persistent resource type may have a configured periodicity similar to a periodic SRS resource set 302 and each semi-persistent resource 304 may have a configured symbol offset within a slot similar to a periodic SRS resource 304. However, a UE 304 may not transmit an SRS in a semi-persistent SRS resource 304 until the BS 302 triggers an activation (e.g., via MAC-CE) of the SRS resource 304. An SRS resource 304 in an SRS resource set 302 with an aperiodic resource type may be utilized by a UE 304 when the UE 304 receives an explicit trigger (e.g., via DCI) from the BS 302.

As discussed above, the configuration 300 includes multiple resources sets 302 each including one or more SRS resources 304. In aspects where the SRS transmitted by the UE using the SRS resources is used for beam management by the BS to which the UE is attached, only one SRS resource in each of the one or more SRS resources may be transmitted at a given time instant, while SRS resources in different SRS resources sets with the same time domain behavior in the same bandwidth part can be transmitted simultaneously.

In some aspects, the parameters of an SRS may be semi-statically configured, i.e., may be configured via an RRC message. For example, an RRC message may configure SRS parameters such as but not limited to SRS bandwidth (i.e., bandwidth to be used for transmission of a SRS), a timing or slot offset between the SRS transmission and the transmission (e.g., DCI transmission) triggering the SRS transmission, starting symbol of the SRS resource, transmission comb value (TxComb) and offset (e.g., for comb-2 or comb-4), cyclic shift (e.g., for TxComb value 2 and 4), an ID of the reference signal (RS) associated with the SRS transmission, etc. In some aspects, the RS can be an SS/PBCH block, CSI-RS configured on the BS to which the UE is attached. In some aspects, a transmission comb is a distributed comb-shaped transmission with equally-spaced outputs allocated over the entire bandwidth.

In some aspects, the SRS can be quasi co-located (QCL'ed) with the SSB, CSI-RS or another RRC configured SRS. For example, the SRS resource can be transmitted with the same spatial domain transmission filter as used for the Rx/Tx of the RS. Quasi co-location (QCL) refers to the relationship between two signals where properties of a channel over which a symbol on one antenna port is conveyed can be inferred from the channel over which a symbol on the other antenna port is conveyed, examples of the noted properties including but not limited to Doppler shift, Doppler spread, average delay, delay spread, spatial RX parameters when applicable, and/or the like.

In some aspects, power control for the SRS transmission by the UE may be controlled by the BS to which the UE is attached. For example, the power control may be via a closed loop transmission power control (TPC) command from the BS as part of the DCI transmission (e.g., DCI format 2_3 transmission of TPC commands for SRS transmissions by the UE). In some aspects, the SRS power may be in accordance with closed loop TPC commands from a BS to a PUSCH transmission. That is, the SRS transmission power may be related to a PUSCH transmission power as dictated by a closed loop TPC command from the BS.

In some aspects, a codepoint of the DCI may trigger one or more aperiodic resource sets configured for a UE. For example, a DCI transmission (e.g., DCI format 0_1 (uplink scheduling grant) and DCI format 1_1 (downlink scheduling assignment)) may include a 2-bit SRS-request that can trigger transmission of one of three different aperiodic resource sets configured for the UE (while the fourth bit combination corresponds to "no triggering" of the SRS resource sets). In some aspects, the minimal time interval between the last symbol of a transmission (e.g., PDCCH transmission) that triggers a aperiodic SRS transmission and the first symbol of the triggered SRS resource is $N_2+14$, where $N_2$ is a number (in symbols) related to UE capability. Further, in some aspects, when a UE receives a DCI that triggers aperiodic SRS in slot n, the UE may transmit aperiodic SRS in each of the triggered SRS resource set(s) in slot $n \cdot 2^{\mu\_SRS}/2^{\mu\_PDCCH}+k$, where k is the semi-statically configured timing or slot offset (e.g., configured by an RRC message) for each triggered SRS resources set and is based on the subcarrier spacing of the triggered SRS transmission, and $\mu_{SRS}$ and $\mu_{PDCCH}$ are the subcarrier spacing configurations for the triggered SRS transmission and the transmission (e.g., PDCCH transmission) triggering the SRS transmission, respectively, as discussed in the 3GPP standard document TS 38.214, titled "Technical Specification 5G; NR; Physical layer procedures for data (3GPP TS 38.214 version 15.4.0 Release 15)", April, 2019, which is incorporated herein by reference in its entirety. In some aspects, the semi-statically configured timing or slot offset k can be a value between 1 slot and 32 slots.

In some aspects, each SRS resource set 302 may be configured for a certain use case, for example, for UL CSI acquisition, DL CSI acquisition (assuming TDD channel reciprocity), and/or beam management. For instance, the BS 302 may determine UL transmission schemes and/or UL precoding based on acquired UL CSI. The BS 302 may determine antenna switching or selection based on DL CSI. In an example, for DL CSI acquisition, the BS 302 may configure a UE 304 with up to two SRS resource sets 302, each having a different resource type. In some instances, the BS 302 may configure a UE 304 with zero or one SRS resource set 302 configured with a resource type of periodic or semi-persistent. In some other instances, the BS 302 may configure a UE 304 with zero to two SRS resource sets 302, each configured with a resource type of aperiodic.

In some aspects, SRSs transmitted by a UE to a BS to which the UE is attached may be used by the BS for channel quality measurements and beam management. In general, beam management refers to the four operations of beam sweeping, beam measurement, beam determination and beam reporting. In some aspects, beam sweeping operation refers to covering a spatial area with a set of beams transmitted and received according to pre-specified intervals and directions. In some aspects, with respect to UL transmission, beam measurement operation refers to the evaluation of the quality of signals received at a BS (e.g., as measured by signal to noise ratios). In some aspects, beam determination operation refers to the selection of a suitable beam(s) at the BS based on the measurement results from the beam measurement operations. In some aspects, beam reporting operation refers to the procedure used by the UE to send beam quality and beam decision information to the Radio Access Network (RAN).

Figure 4A:
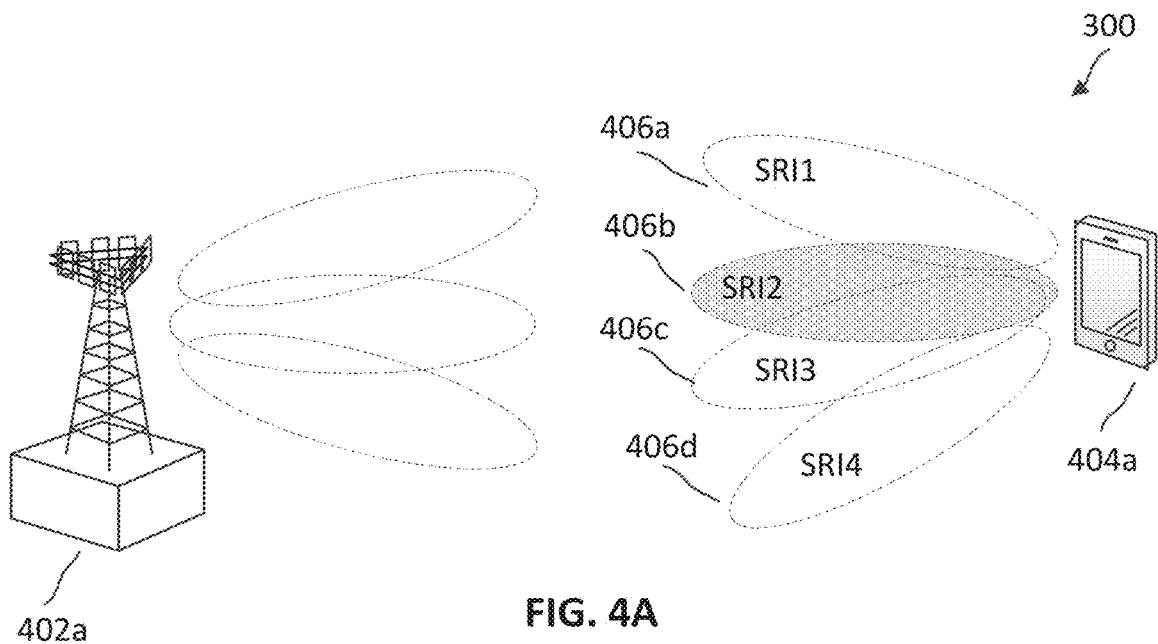
FIGS. 4A-4C illustrate beam measurement procedures according to some aspects of the present disclosure.
Figure 4B:
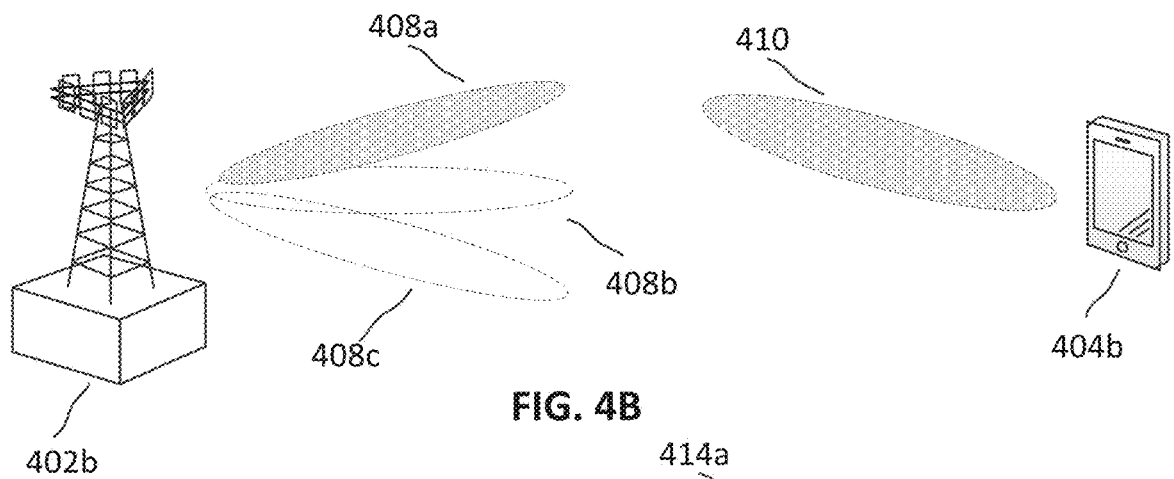
Figure 4C:
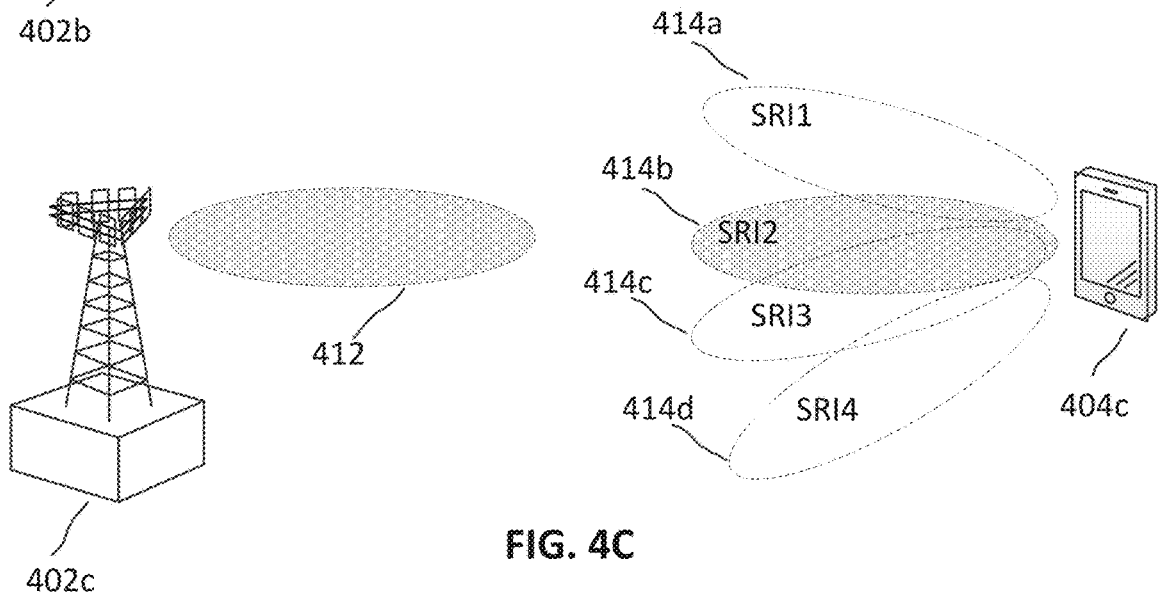

In some aspects, beam management operations, and in particular beam measurement and determination operations may include beam refinements of UE transmit (Tx) beam and BS receive (Rx) beam. With respect to beam refinements of UE Tx beam, in some aspects, the BS may configure and measure multiple SRS instances that are sent by respective multiple UE beams and determine or identify a beam based on the measurements (e.g., a beam with the highest quality). The BS may then indicate to the UE the identified beam via, for example, a DCI transmission to the UE. For instance, the indication may be a SRS resource indicator (SRI) field in the DCI. FIGS. 4A and 4C show example illustration of so-called U1 and U3 procedures where a UE identifies suitable Tx beams. With reference to FIG. 4A, in some aspects, a BS 402a may measure different Tx beams by a UE 404a to aid the UE 404a select the most suitable UE Tx beam 406b as discussed above. That is, the UE 404a may sweep through a set of beams 406 including respective SRS transmissions which the BS 402a receives, and in return provides the UE 404a with SRIs on each beam 406 to allow the UE to select the most suitable beam 406b based on the SRIs. With reference to FIG. 4C, in some aspects, the BS 402c may use the same Rx beam 412 during several instances while the UE may sweep multiple beams 414 each including respective multiple SRS transmissions. As in the case of U1 procedure, the BS 402c may then indicate to the UE 404c the beam 414c identified to be the most suitable via, for example, a DCI transmission to the UE 404c. For instance, the indication may be a SRS resource indicator (SRI) field in the DCI transmitted to the UE 404c.

With respect to beam refinements of BS Rx, in some aspects, the BS may configure and measure multiple SRS instances sent by same UE beam, and select or determine a suitable Rx beam based on the measurements (e.g., a beam with the highest quality). FIG. 4B shows example illustration of so-called U2 procedure where a BS identifies suitable Rx beams. In some aspects, a UE 404b may transmit same beam 410 with multiple instances of SRSs (e.g., for a certain amount of time) to allow the BS 402b to measure different Rx beams 408 based on the multiple SRSs to identify or determine the most suitable Rx beam 408a. In some aspects, the SRS resources corresponding to the multiple SRS instances may be configured with same spatial relation. In some aspects, the BS 402b may not inform or indicate to the UE 404b.

As discussed above, beam management or refinement operations may be based on SRSs transmitted from a UE to a BS to which a UE is attached, and the parameters of the SRS such as SRS corresponding to aperiodic resource sets may be configured semi-statically, i.e., via RRC messages. In some instances, however, semi-static SRS configurations may limit or constrain the beam refinement or management procedures, for example because while the parameters of the SRS may be configured semi-statically, aperiodic SRS resource sets may be triggered dynamically, leading to a conflict between the semi-static SRS configurations and the dynamic triggering of the SRS transmission. For example, the timing or slot offset between a SRS transmission and the transmission (e.g., DCI transmission) triggering the SRS transmission may be semi-statically configured (i.e., configured by RRC messages). The SRS may correspond to an aperiodic SRS resource set triggered dynamically, and the semi-static configuration of the timing or slot offset may be in conflict with the timing of the SRS transmission triggered dynamically. As another example, a PUSCH beam training (i.e., a BS Rx beam refinement as discussed above with reference to U2 procedure of FIG. 4B) may be in conflict with a semi-static timing or slot offset as the timing can be dynamic. For instance, if the timing is less than the timing or slot offset, beam refinement of a PUSCH grant may not occur. That is, the timing may have to exceed the timing or slot offset to allow enough time for beam refinement for the upcoming PUSCH grant. Further, the semi-static configuration of the bandwidth and QCL of the SRS may conflict with the dynamic triggering of the SRS for the beam training. For instance, it may be desirable to have the bandwidth and QCL to be dependent on the PUSCH beam to improve flexibility in beam refinement or training.

As another example, a semi-statically configured bandwidth of a dynamically triggered SRS may be limited by the narrower bandwidth of devices. For example, so-called reduced capability (RedCap) devices used as industrial wireless sensors, video surveillance devices, etc., may be configured primarily to be UL transmitters (i.e., have much larger UL transmissions compared to DL transmissions) and may have latency and data rate requirements that may be undermined due to the semi-static configurations of SRS parameters. For example, industrial wireless sensors may have latency less than about 10 ms (e.g., in some cases from about 5 ms to about 10 ms when safety concerns are paramount) and a peak data rate less than about 2 Mbps. As another example, video surveillance devices may have latency less than about 500 ms and a peak data rate of ranging from about 2 Mbps to about 4 Mbps or from about 7.5 Mbps to about 25 Mbps.

Accordingly, the present disclosure provides mechanisms for configuring SRS resources of a UE with dynamic parameters so that beam refinement procedures can be performed using SRSs that have dynamic parameters. In some aspects, the SRS parameters may be dynamically configured based on explicit indication from a DL transmission from the BS that triggers the SRS transmission to the BS. For example, the BS transmission that triggers the SRS transmission may be a DCI transmission, and the DCI transmission may explicitly indicate to the BS the dynamic configurations of the SRS parameters (e.g., in addition to triggering the SRS transmission). For instance, the DCI transmission may explicitly and dynamically (i.e., after being received at the UE) indicate to the UE the bandwidth an SRS transmitted by the UE to the BS should have. In response, the resource set that includes the SRS resource of the SRS transmission may then be configured with such bandwidth and the UE may transmit an SRS with said bandwidth for use by the BS, for example, to perform beam measurement or refinement procedure. In some aspects, the SRS resources of a UE may be configured by linking or relating the parameters of the SRS transmissions to the parameters of the transmissions triggering the SRS transmission or the parameters of another transmission (e.g., scheduled transmission).

Figure 5A:
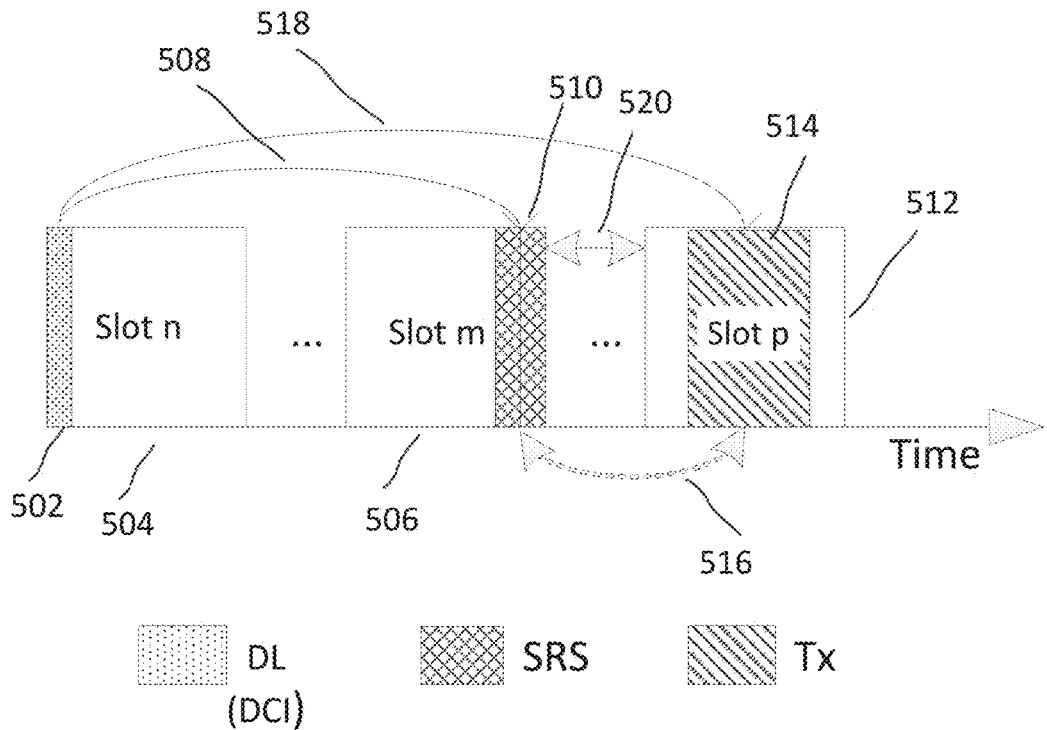
FIGS. 5A-5B show radio frame structures illustrating configuration of dynamic SRS parameters of a SRS transmission of a user equipment (UE), according to some aspects of the present disclosure.
Figure 5B:
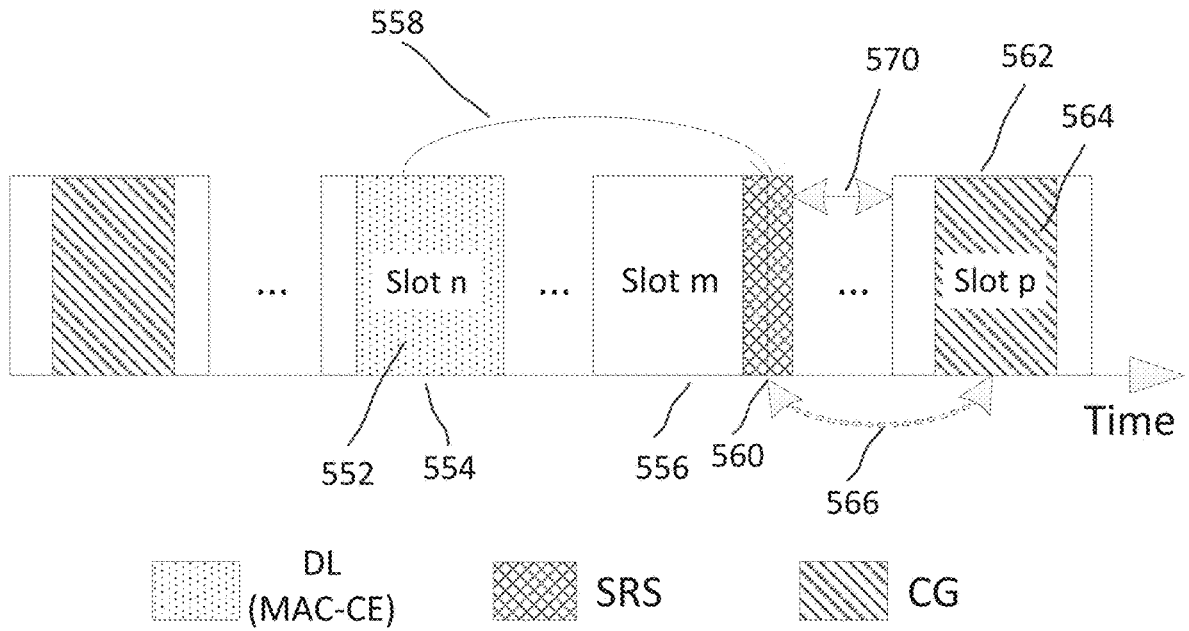

FIGS. 5A-5B show radio frame structures illustrating example dynamic configuration of SRS parameters of a UE in relation to the parameters of the SRS triggering or activating DL transmission or another UL or DL transmission involving the UE, according to some aspects of the present disclosure. In some aspects, with reference to FIG. 5A, the SRS triggering DL transmission 502 can be a DCI transmission (e.g., for UL grant or DL grant) transmitted by a BS to a UE at slot n 504 of a radio frame structure to trigger an aperiodic SRS resource set of the UE, where the SRS resource set contains one or more SRS resources to be used by the UE to transmit a SRS transmission 510 to the BS at a later slot m 506 of the radio frame structure. In some aspects, with reference to FIG. 5B, the SRS activating DL transmission 552 can be a MAC-CE transmission transmitted by a BS to a UE at slot n 554 of a radio frame structure to activate an aperiodic or a semi-persistent SRS resource set of the UE, where the SRS resource set contains one or more SRS resources to be used by the UE to transmit a SRS transmission 560 to the BS at a later slot m 556 of the radio frame structure. In some respects, the resource sets may be periodic, i.e., the SRS may be transmitted periodically using the resources of the resource set without the activation or triggering of the resources.

In some aspects, the SRS may include SRS parameters that are linked or related 508, 558 to the parameters of the DL transmission 502, 552 that triggered the SRS transmission 510, 560. In some aspects, the SRS may include SRS parameters that are linked or related 516, 566 to the parameters of the UL or DL transmission 514, 564 in the radio frame such as but not limited to a PUSCH transmission, a PUCCH transmission, a PDSCH transmission, a PDCCH transmission, etc. One or more of these transmissions may be scheduled 518 by the DL transmission 502. For example, the resource sets of the SRS may be configured to be periodic and the SRS parameter may be linked or related to a parameter of a PUCCH transmission scheduled via a DCI transmission. As another example, the resource sets of the SRS may be configured to be semi-persistent and the SRS parameter may be linked or related to a parameter of a PUSCH configured grant (CG). It is to be noted that these examples are for illustration purposes and are non-limiting, and that in general, the SRS transmitted by a UE to a BS may include SRS parameters that are dynamically related or linked to a parameter of the DL transmission triggering or activating the transmission of the SRS or some other UL or DL transmission in the same radio frame.

In some aspects, the dynamic relationship or linkage between a parameter of the DL transmission 502, 552 or the UL or DL transmission 514, 564 and the SRS parameter may be semi-statically configured (i.e., the relationship or linkage may be configured via an RRC message). In some aspects, the dynamic relationship or linkage between a parameter of the DL transmission 502, 552 or the UL or DL transmission 514, 564 in the radio frame and the SRS parameter may be established or, if existing, overridden by the DL transmission 502, 552. In such aspects, the SRS parameters may not be configured by RRC messages (i.e., the parameters may not be semi-static parameters), but rather may be configured dynamically due to their relationship or linkage to parameters of the DL transmission 502, 552 or the UL or DL transmission 514, 564 in the radio frame. As noted above, the relationship or linkage itself can be semi-statically configured (e.g., via an RRC message from the BS).

For example, there may be a dynamic relationship or linkage 508, 558 between the bandwidth of the SRS transmission 510, 560 and the bandwidth of the DL transmission 502, 552 (e.g., DCI transmission, MAC-CE transmission, etc.) or the UL or DL transmission 514, 564. For instance, the resource sets of the SRS transmission 510, 560 may be configured such that the SRS bandwidth may be a fraction of, equal to or multiple of the bandwidth of the DL transmission 502, 552 the relationship or linkage 508, 558 between the bandwidth of the DL transmission 502, 552 or the UL or DL transmission 514, 564 and the bandwidth of the SRS transmission 510, 560 being configured either semi-statically via an RRC message or dynamically via the triggering DL transmission 502, 552. As such, the SRS transmission 510, 560 from the UE to the BS may have a bandwidth that is a fraction of, equal to or multiple of the bandwidth of the DL transmission 502, 552 or the UL or DL transmission 514, 564. As noted above, such relationship or linkage (i.e., one parameter being a fraction of, equal to or multiple of the other parameter) may be established or, if existing, overridden by the DL transmission 502, 552. For instance, the relationship may be semi-statically configured and may specify that the bandwidth of the SRS transmission should be a fraction of the bandwidth of the DL transmission 502, 552 or the UL or DL transmission 514, 564. In some cases, upon transmission of the DL transmission 502, 552, the UE may dynamically determine, based on the bandwidth of the DL transmission 502, 552 or the UL or DL transmission 514, 564 that the bandwidth of the SRS transmission 510, 560 should be a fraction of the bandwidth of the DL transmission 502, 552 or the UL or DL transmission 514, 564. In other cases, however, the DL transmission 502 may override the semi-statically configured relationship and establish that the bandwidth of the SRS transmission 510, 560 should be equal to the bandwidth of the DL transmission 502, 552 or the UL or DL transmission 514, 564. In either cases, the bandwidth of the SRS transmission 510, 560 may be determined dynamically based on the bandwidth of the triggering DL transmission 502, 552 or the UL or DL transmission 514, 564 in the radio frame.

As another example, there may be a dynamic relationship or linkage 508 between the timing or slot offset between the triggering DL transmission 502 and the SRS transmission 510 and the timing field or parameter of the DL transmission 502 or the UL or DL transmission 514. For instance, the timing or slot offset can be less than, equal to or greater than the timing parameter of the DCI transmission 502 or the UL or DL transmission 514. In some cases, such a relationship can be configured semi-statically (i.e., via an RRC message). In some cases, as noted above, such relationship or linkage (i.e., one parameter being less than, equal to or greater than the other parameter) may be established dynamically or, if existing, overridden by the DL transmission 502. That is, the DL transmission 502 may override the semi-statically configured relationship and establish a different relationship or linkage between the timing or slot offset and the timing. In such cases, the SRS parameter, the timing or slot offset, would be configured dynamically based on the timing parameter based on the semi-static or dynamic relationship between the parameters of the DL transmission 502 or the UL or DL transmission 514 (i.e., timing parameter or field) and the SRS parameter (i.e., timing or slot offset). As noted above, the UL or DL transmission 514 can be a PUSCH transmission, a PUCCH transmission, a PDSCH transmission, a PDCCH transmission, etc. In some aspects, for PUSCH or PDSCH transmissions, the timing can be a time domain resource allocation (TDRA).

As yet another example, there may be a dynamic relationship or linkage 508, 558 between the QCL relationship of the SRS transmission 510, 560 and the QCL of the DL transmission 502. For example, a PUSCH transmission may be QCL'ed with a demodulation reference signal (DMRS). Further, the SRS may be QCL'ed with a RS. In such cases, there may be a dynamic relationship or linkage between the QCL relationship of the SRS transmission and the QCL relationship of the PUSCH transmission.

As yet another example, there may be a dynamic relationship or linkage 508, 558 between the transmit (Tx) power of the SRS transmission 510, 560 and the Tx power of the UL transmission 514, 564. For instance, the resource sets of the SRS transmission 510, 560 may be configured such that the SRS Tx power may be a fraction of, equal to or multiple of the Tx power of the UL transmission 514, 564, the relationship or linkage 508, 558 between the Tx power of the UL transmission 514, 564 and the Tx power of the SRS transmission 510, 560 being configured either semi-statically via an RRC message or dynamically via the triggering DL transmission 502, 552. As such, the SRS transmission 510, 560 from the UE to the BS may have a Tx power that is a fraction of, equal to or multiple of the Tx power of the UL transmission 514, 564. As noted above, such relationship or linkage (i.e., one parameter being a fraction of, equal to or multiple of the other parameter) may be established or, if existing, overridden by the UL transmission 514, 564. For instance, the relationship may be semi-statically configured and may specify that the Tx power of the SRS transmission should be a fraction of the Tx power of the UL transmission 514, 564. In some cases, upon transmission of the DL transmission 502, 552, the UE may dynamically determine, based on the Tx power of the UL transmission 514, 564 that the bandwidth of the SRS transmission 510, 560 should be a fraction of the bandwidth of the UL transmission 514, 564. In other cases, however, the DL transmission 502, 552 may override the semi-statically configured relationship and establish that the Tx power of the SRS transmission 510, 560 should be equal to the Tx power of the UL transmission 514, 564. In either cases, the bandwidth of the SRS transmission 510, 560 may be determined dynamically based on the bandwidth of the UL transmission 514, 564 in the radio frame. As noted above, the UL transmission 514, 564 can be a PUSCH transmission, a PUCCH transmission, etc.

In some aspects, the switching delay, i.e., the delay between the SRS transmission 510, 560 and the UL or DL transmission 512, 562 may be semi-statically configured (i.e., via RRC message), can be dynamically indicated or configured as discussed above (e.g., via the DL transmissions 502, 522) or may be based on the capability of the UE.

Figure 6:
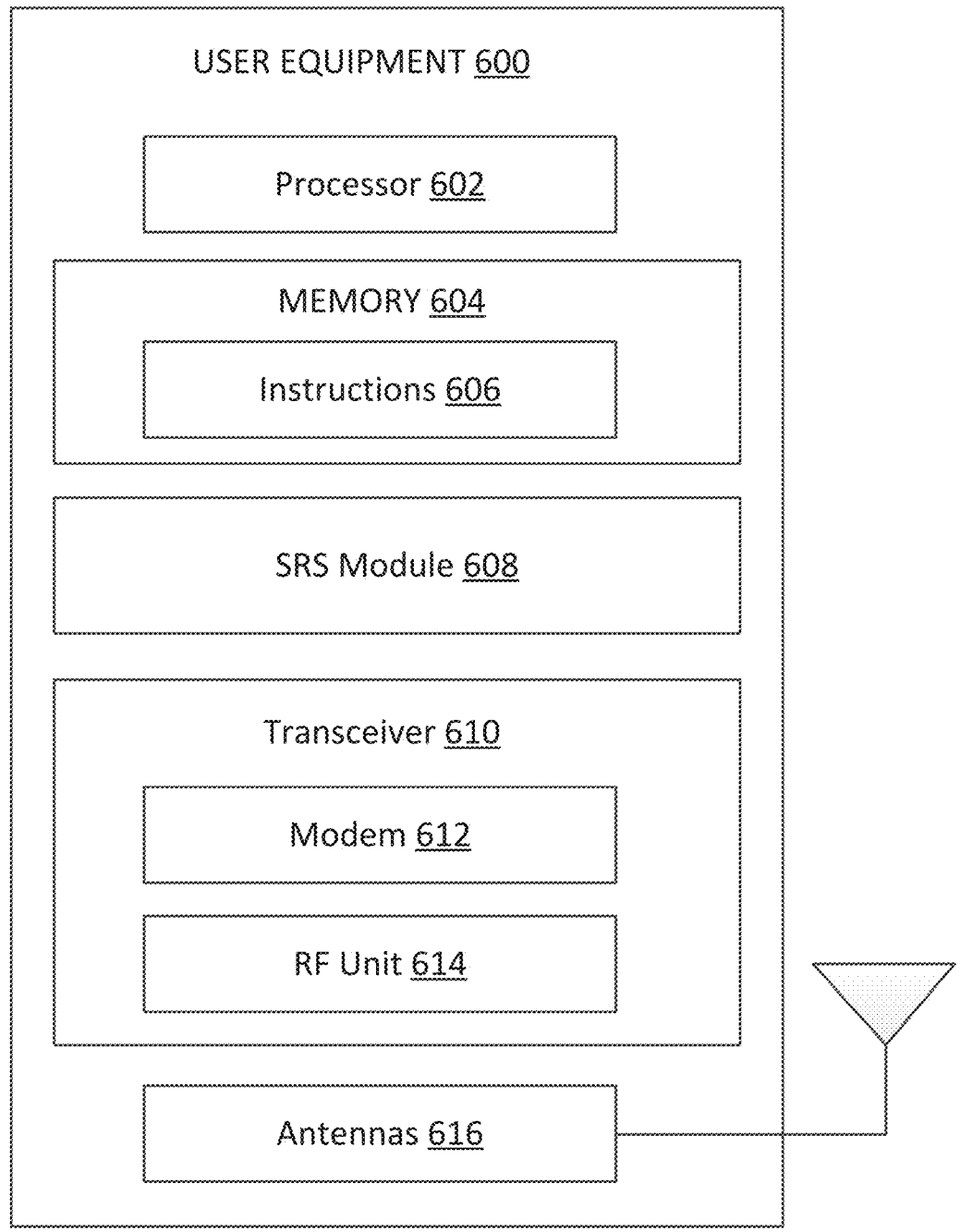
FIG. 6 is a block diagram of an exemplary UE according to some aspects of the present disclosure.

FIG. 6 is a block diagram of an exemplary UE 600 according to some aspects of the present disclosure. The UE 600 may be a UE 115 in the network 100 as discussed above in FIG. 1. As shown, the UE 600 may include a processor 602, a memory 604, an SRS module 608, a transceiver 610 including a modem subsystem 612 and a RF unit 614, and one or more antennas 616. These elements may be in direct or indirect communication with each other, for example via one or more buses.

The processor 602 may have various features as a specific-type processor. For example, these may include a CPU, a DSP, an ASIC, a controller, a FPGA device, another hardware device, a firmware device, or any combination thereof configured to perform the operations described herein. The processor 602 may also be implemented as a combination of computing devices, e.g., a combination of a DSP and a microprocessor, a plurality of microprocessors, one or more microprocessors in conjunction with a DSP core, or any other such configuration.

The memory 604 may include a cache memory (e.g., a cache memory of the processor 602), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 604 may include a non-transitory computer-readable medium. The memory 604 may store instructions 606. The instructions 606 may include instructions that, when executed by the processor 602, cause the processor 602 to perform operations described herein, for example, aspects of FIGS. 3, 4A-4C, 5A-5B, and 9. Instructions 606 may also be referred to as program code. The program code may be for causing a wireless communication device to perform these operations, for example by causing one or more processors (such as processor 602) to control or command the wireless communication device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The SRS module 608 may be implemented via hardware, software, or combinations thereof. For example, the SRS module 608 may be implemented as a processor, circuit, and/or instructions 606 stored in the memory 604 and executed by the processor 602. In some examples, the SRS module 608 can be integrated within the modem subsystem 612. For example, the SRS module 608 can be implemented by a combination of software components (e.g., executed by a DSP or a general processor) and hardware components (e.g., logic gates and circuitry) within the modem subsystem 612.

The SRS module 608 may be used for various aspects of the present disclosure, for example, aspects of FIGS. 3, 4A-4C, 5A-5B, and 9. For example, the SRS module 608 may be configured to receive a downlink (DL) transmission including a DL transmission parameter from a BS (e.g., the BSs 105, 42, and/or 700) to which the UE is attached. The SRS module 608 may be configured to trigger, activate or allow a SRS including a SRS parameter to be transmitted from the UE to the BS, the SRS parameter dynamically related to the DL transmission parameter or a first parameter of a first transmission different from the DL transmission. The SRS module 608 may be configured to transmit a beam to the BS, and further transmit the SRS using a SRS resource of the UE to facilitate beam refinement on the beam by the BS.

As shown, the transceiver 610 may include the modem subsystem 612 and the RF unit 614. The transceiver 610 can be configured to communicate bi-directionally with other devices, such as the UEs 115 and/or another core network element. The modem subsystem 612 may be configured to modulate and/or encode data according to a MCS, e.g., a LDPC coding scheme, a turbo coding scheme, a convolutional coding scheme, a digital beamforming scheme, etc. The RF unit 614 may be configured to process (e.g., perform analog to digital conversion or digital to analog conversion, etc.) modulated/encoded data (e.g., PDSCH signal, PDCCH signal, SRS resource configuration, SRS resource activation, SRS resource deactivation) from the modem subsystem 612 (on outbound transmissions) or of transmissions originating from another source such as a UE 115. The RF unit 614 may be further configured to perform analog beamforming in conjunction with the digital beamforming. Although shown as integrated together in transceiver 610, the modem subsystem 612 and/or the RF unit 614 may be separate devices that are coupled together at the UE 600 to enable the UE 600 to communicate with other devices.

The RF unit 614 may provide modulated and/or processed data, e.g. data packets (or, more generally, data messages that may contain one or more data packets and other information), to the antennas 616 for transmission to one or more other devices. This may include, for example, transmission of information to complete attachment to a network and communication with a camped UE 115 according to some aspects of the present disclosure. The antennas 616 may further receive data messages transmitted from other devices and provide the received data messages for processing and/or demodulation at the transceiver 610. The transceiver 610 may provide the demodulated and decoded data (e.g., PUSCH signal, UL data, SRSs, UE capability reports, RI reports) to the SRS module 608 for processing. The antennas 616 may include multiple antennas of similar or different designs to sustain multiple transmission links.

In an aspect, the UE 600 can include multiple transceivers 610 implementing different RATs (e.g., NR and LTE). In an aspect, the UE 600 can include a single transceiver 610 implementing multiple RATs (e.g., NR and LTE). In an aspect, the transceiver 610 can include various components, where different combinations of components can implement different RATs.

Figure 7:
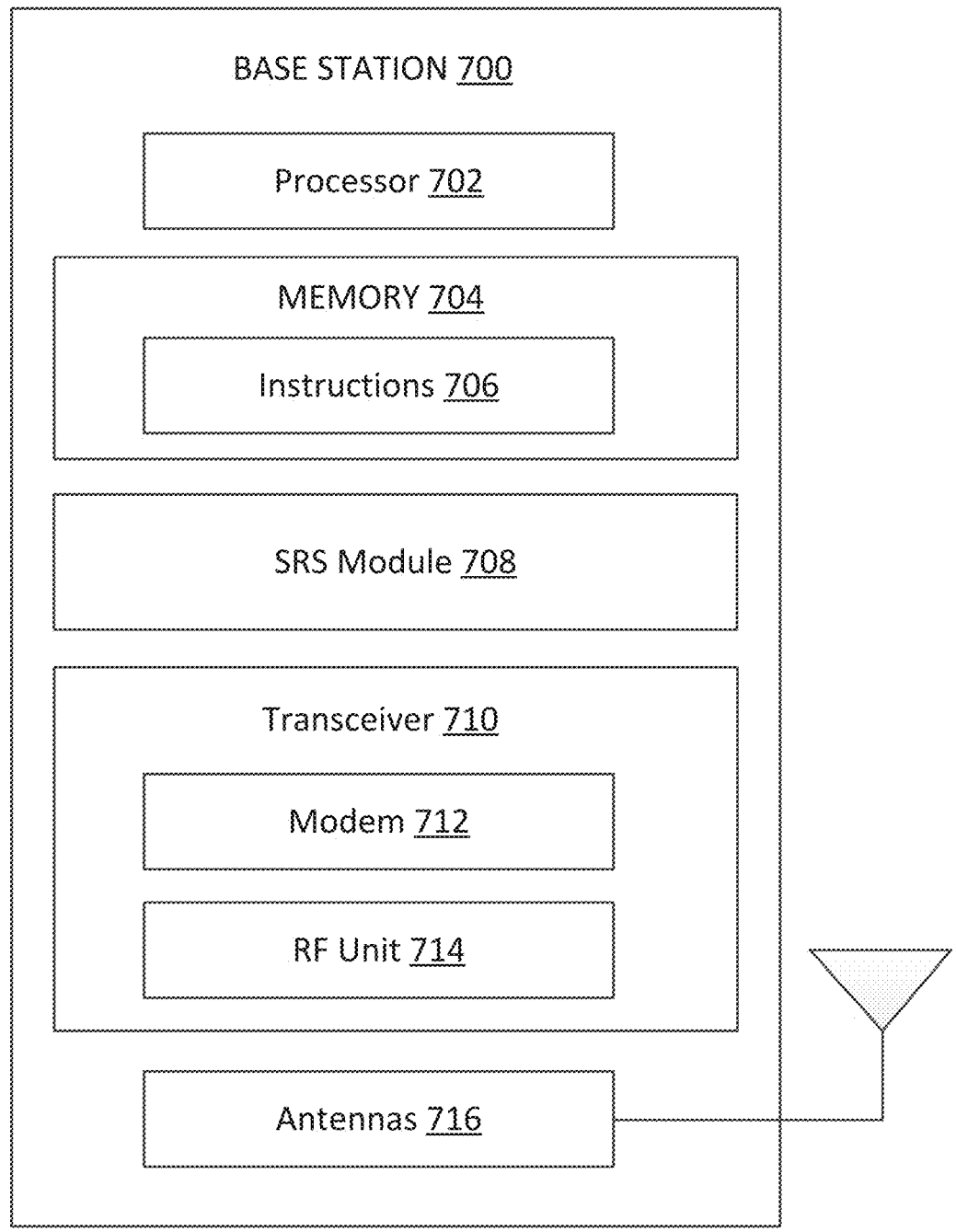
FIG. 7 is a block diagram of an exemplary base station (BS) according to some aspects of the present disclosure.

FIG. 7 is a block diagram of an exemplary BS 700 according to some aspects of the present disclosure. The BS 700 may be a BS 105 discussed above in FIG. 1. As shown, the BS 700 may include a processor 702, a memory 704, a SRS module 708, a transceiver 710 including a modem subsystem 712 and a radio frequency (RF) unit 714, and one or more antennas 716. These elements may be in direct or indirect communication with each other, for example via one or more buses.

The processor 702 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 702 may also be implemented as a combination of computing devices, e.g., a combination of a DSP and a microprocessor, a plurality of microprocessors, one or more microprocessors in conjunction with a DSP core, or any other such configuration.

The memory 704 may include a cache memory (e.g., a cache memory of the processor 702), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 704 includes a non-transitory computer-readable medium. The memory 704 may store, or have recorded thereon, instructions 706. The instructions 706 may include instructions that, when executed by the processor 702, cause the processor 702 to perform the operations described herein with reference to the UEs 115 in connection with aspects of the present disclosure, for example, aspects of FIGS. 4A-4C, and 8. Instructions 706 may also be referred to as program code, which may be interpreted broadly to include any type of computer-readable statement(s) as discussed above with respect to FIG. 6.

The SRS module 708 may be implemented via hardware, software, or combinations thereof. For example the SRS module 708 may be implemented as a processor, circuit, and/or instructions 706 stored in the memory 704 and executed by the processor 702. In some examples, the SRS module 708 can be integrated within the modem subsystem 712. For example, the SRS module 708 can be implemented by a combination of software components (e.g., executed by a DSP or a general processor) and hardware components (e.g., logic gates and circuitry) within the modem subsystem 712.

The SRS module 708 may be used for various aspects of the present disclosure, for example, aspects of FIGS. 4A-4C, and 8. The SRS module 708 may be configured to receive a downlink (DL) transmission including a DL transmission parameter from a base station (BS) to which the UE is attached. In some aspects, the SRS module 708 may be configured to trigger, activate or allow a SRS including a SRS parameter to be transmitted from the UE to the BS, the SRS parameter dynamically related to the DL transmission parameter or a first parameter of a first transmission different from the DL transmission. In addition, the SRS module 708 may be configured to transmit a beam to the BS; and further transmit the SRS using a SRS resource of the UE to facilitate beam refinement on the beam by the BS.

As shown, the transceiver 710 may include a modem subsystem 712 and an RF unit 714. The transceiver 710 can be configured to communicate bi-directionally with other devices, such as the BSs 105. The modem subsystem 712 may be configured to modulate and/or encode the data from the memory 704 according to a modulation and coding scheme (MCS), e.g., a low-density parity check (LDPC) coding scheme, a turbo coding scheme, a convolutional coding scheme, a digital beamforming scheme, etc. The RF unit 714 may be configured to process (e.g., perform analog to digital conversion or digital to analog conversion, etc.) modulated/encoded data (e.g., PUSCH signal, UL data, SRSs, UE capability reports, RI reports) from the modem subsystem 712 (on outbound transmissions) or of transmissions originating from another source such as a UE 115 or a BS 105. The RF unit 714 may be further configured to perform analog beamforming in conjunction with the digital beamforming. Although shown as integrated together in transceiver 710, the modem subsystem 712 and the RF unit 714 may be separate devices that are coupled together at the BS 700 to enable the BS 700 to communicate with other devices.

The RF unit 714 may provide modulated and/or processed data, e.g. data packets (or, more generally, data messages that may contain one or more data packets and other information), to the antennas 716 for transmission to one or more other devices. The antennas 716 may further receive data messages transmitted from other devices. The antennas 716 may provide the received data messages for processing and/or demodulation at the transceiver 710. The transceiver 710 may provide the demodulated and decoded data (e.g., PDSCH signal, PDCCH, DL data, SRS resource configuration, SRS resource activation, SRS resource deactivation) to the SRS module 708. The antennas 716 may include multiple antennas of similar or different designs in order to sustain multiple transmission links. The RF unit 714 may configure the antennas 716.

In an aspect, the BS 700 can include multiple transceivers 710 implementing different RATs (e.g., NR and LTE). In an aspect, the BS 700 can include a single transceiver 710 implementing multiple RATs (e.g., NR and LTE). In an aspect, the transceiver 710 can include various components, where different combinations of components can implement different RATs.

Figure 8:
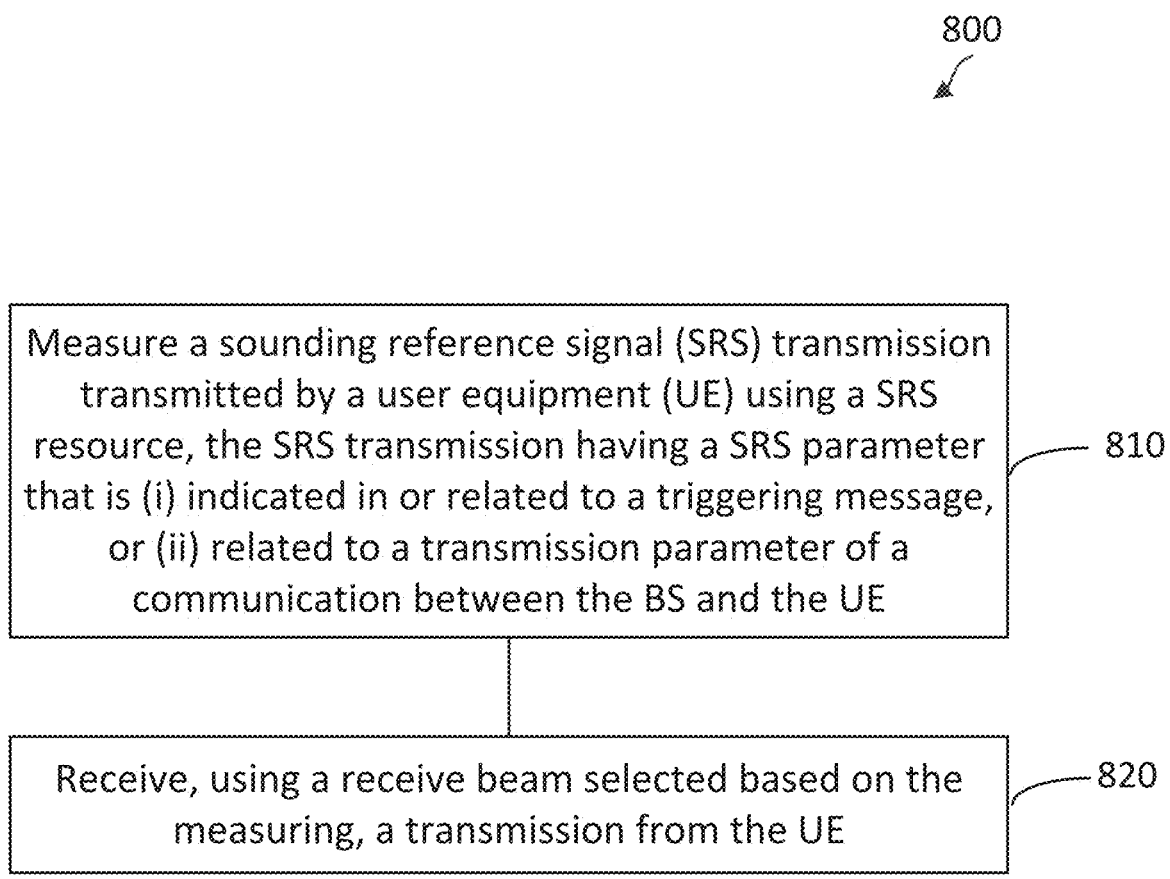
FIG. 8 is a flow diagram of a wireless communication method according to some aspects of the present disclosure.

FIG. 8 is a flow diagram of a wireless communication method 800 according to some aspects of the present disclosure. Aspects of the method 800 can be executed by a computing device (e.g., a processor, processing circuit, and/or other suitable component) of a wireless communication device or other suitable means for performing the steps. For example, a wireless communication device, such as the BSs 105, 402, and/or 702 may utilize one or more components, such as the processor 702, the memory 704, the SRS module 708, the transceiver 710, the modem 712, and the one or more antennas 716, to execute the steps of method 800. As illustrated, the method 800 includes a number of enumerated steps, but aspects of the method 700 may include additional steps before, after, and in between the enumerated steps. In some aspects, one or more of the enumerated steps may be omitted or performed in a different order.

At block 810, a BS (e.g., the BSs 105, 402 and/or 700) may measure a sounding reference signal (SRS) transmission transmitted by a user equipment (UE) using a SRS resource. In some instances, the SRS transmission may have a SRS parameter that is (i) indicated in or related to a triggering message, or (ii) related to a transmission parameter of a communication between the BS and the UE.

At block 820, the BS may receive, using a receive beam selected based on the measuring, a transmission from the UE.

In some instances, the BS may utilize one or more components, such as the processor 702, the memory 704, the SRS module 708, the transceiver 710, the modem 712, and the one or more antennas 716, to transmit, to the UE, a downlink (DL) transmission including a DL transmission parameter to measure a plurality of sounding reference signal (SRS) transmissions received in a first beam transmitted by a user equipment (UE); and to select a receive beam of the BS for receiving the first beam.

Figure 9:
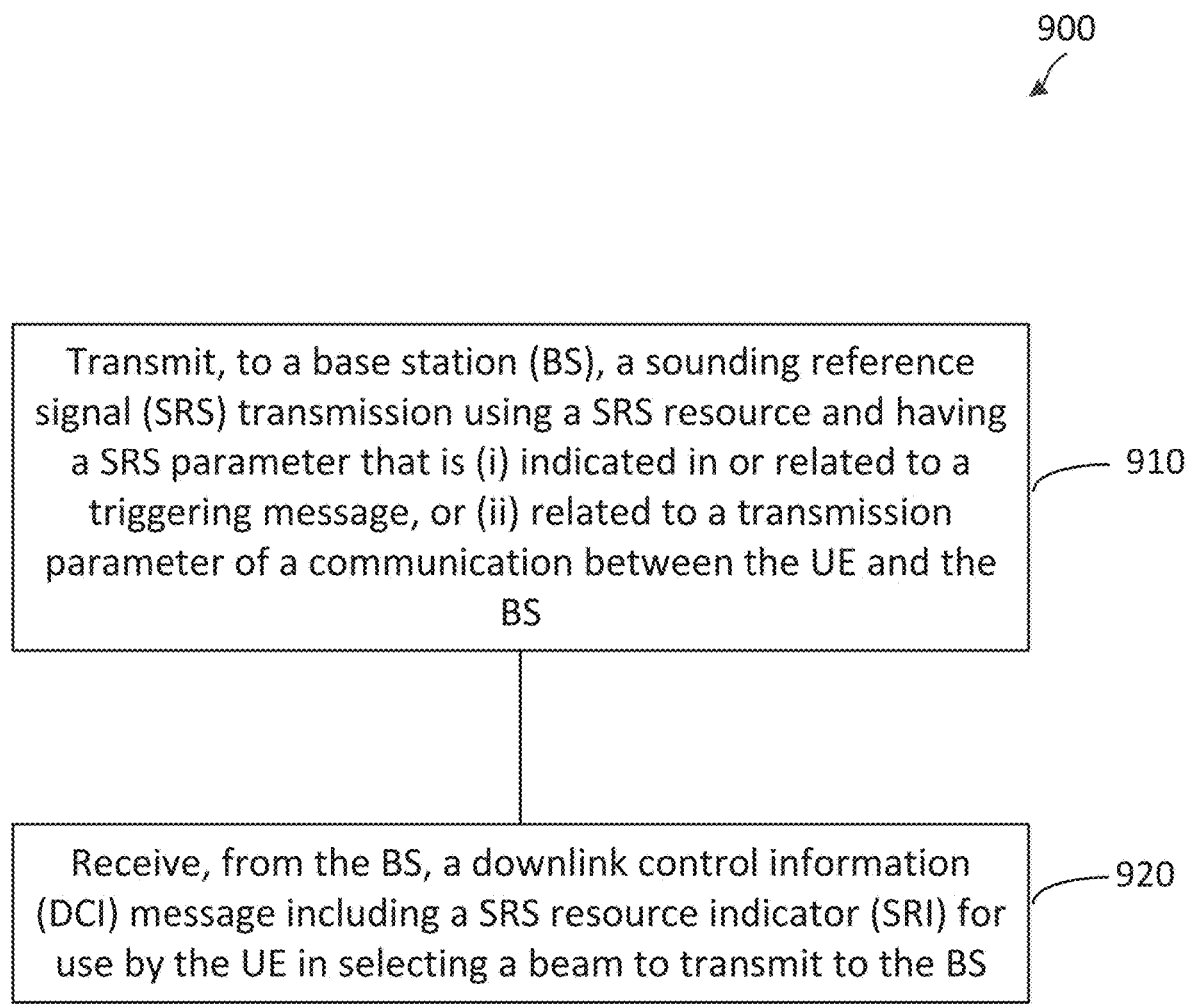
FIG. 9 is a flow diagram of a wireless communication method according to some aspects of the present disclosure.

FIG. 9 is a flow diagram of a wireless communication method 900 according to some aspects of the present disclosure. Aspects of the method 900 can be executed by a computing device (e.g., a processor, processing circuit, and/or other suitable component) of a wireless communication device or other suitable means for performing the steps. For example, a wireless communication device, such as the UEs 115, 404 and/or 600 may utilize one or more components, such as the processor 602, the memory 604, the SRS module 608, the transceiver 610, the modem 612, and the one or more antennas 616, to execute the steps of method 900. As illustrated, the method 900 includes a number of enumerated steps, but aspects of the method 900 may include additional steps before, after, and in between the enumerated steps. In some aspects, one or more of the enumerated steps may be omitted or performed in a different order.

At block 910, a UE (e.g., the UEs 115, 404 and/or 600) can transmit a to a base station (BS) a sounding reference signal (SRS) transmission using a SRS resource and having a SRS parameter that is (i) indicated in or related to a triggering message, or (ii) related to a transmission parameter of a communication between the UE and the BS.

At block 920, the UE can receive, from the BS, a downlink control information (DCI) message including a SRS resource indicator (SRI) for use by the UE in selecting a beam to transmit to the BS.

In some instances, the UE may utilize one or more components, such as the processor 602, the memory 604, the SRS module 608, the transceiver 610, the modem 612, and the one or more antennas 616, to transmit a plurality of beams to a base station (BS); and receive, from the BS, a downlink control information (DCI) message including a SRS resource indicator (SRI) for use by the UE in selecting a beam of the plurality of beams to transmit to the BS.

In some aspects of the methods 800 and 900, the communication is a physical uplink shared channel (PUSCH) transmission or a physical uplink control channel (PUCCH) transmission; the transmission parameter is a bandwidth of the PUSCH transmission or the PUCCH transmission; and the SRS parameter is a bandwidth of the SRS transmission that is related to the bandwidth of the PUSCH transmission or the PUCCH transmission, respectively.

In some aspects of the methods 800 and 900, the communication is a PUSCH transmission or a PUCCH transmission; the transmission parameter is a timing parameter of the PUSCH transmission or the PUCCH transmission; and the SRS parameter is a timing offset of the SRS transmission that is related to the timing parameter of the PUSCH transmission or the PUCCH transmission, respectively.

In some aspects of the methods 800 and 900, the communication is a PUSCH transmission or a PUCCH transmission; the transmission parameter is a QCL indication of the PUSCH transmission or the PUCCH transmission; and the SRS parameter is a QCL indication of the SRS transmission that is related to the QCL indication of the PUSCH transmission or the PUCCH transmission, respectively.

In some aspects of the methods 800 and 900, the communication is a PUSCH transmission or a PUCCH transmission; the transmission parameter is a transmit power of the PUSCH transmission or the PUCCH transmission; and the SRS parameter is a transmit power of the SRS transmission that is related to the transmit power of the PUSCH transmission or the PUCCH transmission, respectively.

In some aspects of the methods 800 and 900, the SRS resource is an aperiodic resource and the triggering message is a downlink control information (DCI) transmission or a medium access control (MAC)-control element (CE) transmission. In such aspects, the SRS parameter may be related to the triggering message includes (i) a bandwidth of the SRS transmission being related to a bandwidth of the triggering message; a timing offset of the SRS transmission being related to a timing parameter of the triggering message; or (iii) a QCL relationship indication of the SRS transmission being related to a QCL relationship indication of the triggering message.

In some aspects of the methods 800 and 900, the SRS resource is a periodic resource.

In some aspects of the methods 800 and 900, the communication is a physical downlink shared channel (PDSCH) transmission or a physical downlink control channel (PDCCH) transmission; the transmission parameter is a bandwidth of the PDSCH transmission or the PDCCH transmission; and the SRS parameter is a bandwidth of the SRS transmission that is related to the bandwidth of the PDSCH transmission or the PDCCH transmission, respectively.

In some aspects of the methods 800 and 900, the communication is a PDSCH transmission or a PDCCH transmission; the transmission parameter is a timing parameter of the PDSCH transmission or the PDCCH transmission; and the SRS parameter is a timing offset of the SRS transmission that is related to the timing parameter of the PDSCH transmission or the PDCCH transmission, respectively.

In some aspects of the methods 800 and 900, the communication is a PDSCH transmission or a PDCCH transmission; the transmission parameter is a QCL relationship indication of the PDSCH transmission or the PDCCH transmission; and the SRS parameter is a QCL relationship indication of the SRS transmission that is related to the QCL indication of the PDSCH transmission or PDCCH transmission, respectively.

In some aspects of the methods 800 and 900, a switching delay between the SRS transmission and the communication is configured via a radio resource control (RRC) message from the BS.

In some aspects of the methods 800 and 900, the SRS parameter is related to the transmission parameter of the communication via a RRC configuration message from the BS. In such aspects, the triggering message is configured to override the relationship between the SRS parameter and the transmission parameter of the communication.

Some aspects of the present disclosure disclose a non-transitory computer-readable medium (CRM) having program code recorded thereon. In some aspects, the program code comprises code for causing a BS to measure a sounding reference signal (SRS) transmission transmitted by a user equipment (UE) using a SRS resource. In some instances, the SRS transmission may have a SRS parameter that is (i) indicated in or related to a triggering message, or (ii) related to a transmission parameter of a communication between the BS and the UE. Further, the program code comprises code for causing the BS to receive, using a receive beam selected based on the measuring, a transmission from the UE.

Some aspects of the present disclosure disclose a non-transitory computer-readable medium (CRM) having program code recorded thereon. In some aspects, the program code comprises code for causing a UE to transmit a sounding reference signal (SRS) transmission using a SRS resource and having a SRS parameter that is (i) indicated in or related to a triggering message, or (ii) related to a transmission parameter of a communication between the UE and the BS. The program code further comprises code for causing the UE to receive, from the BS, a downlink control information (DCI) message including a SRS resource indicator (SRI) for use by the UE in selecting a beam to transmit to the BS.

Some aspects of the present disclosure disclose a BS comprising means for measuring a sounding reference signal (SRS) transmission transmitted by a user equipment (UE) using a SRS resource. In some instances, the SRS transmission may have a SRS parameter that is (i) indicated in or related to a triggering message, or (ii) related to a transmission parameter of a communication between the BS and the UE; and means for receive, using a receive beam selected based on the measuring, a transmission from the UE.

Some aspects of the present disclosure disclose a UE comprising means transmit a sounding reference signal (SRS) transmission using a SRS resource and having a SRS parameter that is (i) indicated in or related to a triggering message, or (ii) related to a transmission parameter of a communication between the UE and the BS. Further, the UE comprises means for receiving, from the BS, a downlink control information (DCI) message including a SRS resource indicator (SRI) for use by the UE in selecting a beam to transmit to the BS.

Recitations of Some Aspects of the Disclosure

Aspect 1: A method of wireless communication performed by a base station (BS), the method comprising: measuring a sounding reference signal (SRS) transmission transmitted by a user equipment (UE) using a SRS resource, the SRS transmission having a SRS parameter that is (i) indicated in or related to a triggering message, or (ii) related to a transmission parameter of a communication between the BS and the UE; and receiving, using a receive beam selected based on the measuring, a transmission from the UE.

Aspect 2: The method of aspect 1, wherein: the communication is a physical uplink shared channel (PUSCH) transmission or a physical uplink control channel (PUCCH) transmission; the transmission parameter includes a bandwidth of the PUSCH transmission or the PUCCH transmission; and the SRS parameter includes a bandwidth of the SRS transmission that is related to the bandwidth of the PUSCH transmission or the PUCCH transmission, respectively.

Aspect 3: The method of aspect 1 or 2, wherein the communication is a PUSCH transmission or a PUCCH transmission; the transmission parameter includes a timing parameter of the PUSCH transmission or the PUCCH transmission; and the SRS parameter includes a timing offset of the SRS transmission that is related to the timing parameter of the PUSCH transmission or the PUCCH transmission, respectively.

Aspect 4: The method of any of aspects 1-3, wherein the communication is a PUSCH transmission or a PUCCH transmission; the transmission parameter includes a QCL indication of the PUSCH transmission or the PUCCH transmission; and the SRS parameter includes a QCL indication of the SRS transmission that is related to the QCL indication of the PUSCH transmission or the PUCCH transmission, respectively.

Aspect 5: The method of any of aspects 1-4, wherein the communication is a PUSCH transmission or a PUCCH transmission; the transmission parameter includes a transmit power of the PUSCH transmission or the PUCCH transmission; and the SRS parameter includes a transmit power of the SRS transmission that is related to the transmit power of the PUSCH transmission or the PUCCH transmission, respectively.

Aspect 6: The method of any of aspects 1-5, wherein the SRS resource is an aperiodic resource and the triggering message is a downlink control information (DCI) transmission or a medium access control (MAC)-control element (CE) transmission.

Aspect 7: The method of any of aspects 1-6, wherein the SRS parameter being related to the triggering message includes (i) a bandwidth of the SRS transmission being related to a bandwidth of the triggering message; a timing offset of the SRS transmission being related to a timing parameter of the triggering message; or (iii) a QCL relationship indication of the SRS transmission being related to a QCL relationship indication of the triggering message.

Aspect 8: The method of any of aspects 1-5, wherein the SRS resource is a periodic resource.

Aspect 9: The method of aspect 1, wherein the communication is a physical downlink shared channel (PDSCH) transmission or a physical downlink control channel (PDCCH) transmission; the transmission parameter is a bandwidth of the PDSCH transmission or the PDCCH transmission; and the SRS parameter is a bandwidth of the SRS transmission that is related to the bandwidth of the PDSCH transmission or the PDCCH transmission, respectively.

Aspect 10: The method of any of aspects 1, and 6-9, wherein the communication is a PDSCH transmission or a PDCCH transmission; the transmission parameter is a timing parameter of the PDSCH transmission or the PDCCH transmission; and the SRS parameter is a timing offset of the SRS transmission that is related to the timing parameter of the PDSCH transmission or the PDCCH transmission, respectively.

Aspect 11: The method of any of aspects 1, and 6-10, wherein the communication is a PDSCH transmission or a PDCCH transmission; the transmission parameter is a QCL relationship indication of the PDSCH transmission or the PDCCH transmission; and the SRS parameter is a QCL relationship indication of the SRS transmission that is related to the QCL indication of the PDSCH transmission or PDCCH transmission, respectively.

Aspect 12: The method of any of aspects 1, and 6-13, wherein a switching delay between the SRS transmission and the communication is configured via a radio resource control (RRC) message from the BS.

Aspect 13: The method of any of aspects 1, and 6-12, wherein the SRS parameter is related to the transmission parameter of the communication via a RRC configuration message from the BS.

Aspect 14: The method of any of aspects 1, and 6-13, wherein the triggering message is configured to override the relationship between the SRS parameter and the transmission parameter of the communication.

Aspect 15: A method of wireless communication performed by a user equipment (UE), the method comprising: transmitting to a base station (BS) a sounding reference signal (SRS) transmission using a SRS resource and having a SRS parameter that is (i) indicated in or related to a triggering message, or (ii) related to a transmission parameter of a communication between the UE and the BS; and receiving, from the BS, a downlink control information (DCI) message including a SRS resource indicator (SRI) for use by the UE in selecting a beam to transmit to the BS.

Aspect 16: The method of aspect 15, wherein the communication is a physical downlink shared channel (PDSCH) transmission or a physical downlink control channel (PDCCH) transmission; the transmission parameter is a bandwidth of the PDSCH transmission or the PDCCH transmission; and the SRS parameter is a bandwidth of the SRS transmission that is related to the bandwidth of the PDSCH transmission or the PDCCH transmission, respectively.

Aspect 17: The method of aspect 15 or 16, wherein the communication is a PDSCH transmission or a PDCCH transmission; the transmission parameter is a timing parameter of the PDSCH transmission or the PDCCH transmission; and the SRS parameter is a timing offset of the SRS transmission that is related to the timing parameter of the PDSCH transmission or the PDCCH transmission, respectively.

Aspect 18: The method of any of aspects 15-17, wherein the communication is a PDSCH transmission or a PDCCH transmission; the transmission parameter is a QCL relationship indication of the PDSCH transmission or the PDCCH transmission; and the SRS parameter is a QCL relationship indication of the SRS transmission that is related to the QCL indication of the PDSCH transmission or PDCCH transmission, respectively.

Aspect 19: The method of any of aspects 15-18, wherein a switching delay between the SRS transmission and the communication is configured via a radio resource control (RRC) message from the BS.

Aspect 20: The method of any of aspects 15-19, wherein the SRS parameter is related to the transmission parameter of the communication via a RRC configuration message from the BS.

Aspect 21: The method of any of aspects 15-20, wherein the triggering message is configured to override the relationship between the SRS parameter and the transmission parameter of the communication.

Aspect 22: The method of any of aspect 15, and 19-21, wherein: the communication is a physical uplink shared channel (PUSCH) transmission or a physical uplink control channel (PUCCH) transmission; the transmission parameter includes a bandwidth of the PUSCH transmission or the PUCCH transmission; and the SRS parameter includes a bandwidth of the SRS transmission that is related to the bandwidth of the PUSCH transmission or the PUCCH transmission, respectively.

Aspect 23: The method of any of aspect 15, and 19-22, wherein the communication is a PUSCH transmission or a PUCCH transmission; the transmission parameter includes a timing parameter of the PUSCH transmission or the PUCCH transmission; and the SRS parameter includes a timing offset of the SRS transmission that is related to the timing parameter of the PUSCH transmission or the PUCCH transmission, respectively.

Aspect 24: The method of any of aspect 15, and 19-23, wherein the communication is a PUSCH transmission or a PUCCH transmission; the transmission parameter includes a QCL indication of the PUSCH transmission or the PUCCH transmission; and the SRS parameter includes a QCL indication of the SRS transmission that is related to the QCL indication of the PUSCH transmission or the PUCCH transmission, respectively.

Aspect 25: The method of any of aspect 15, and 19-24, wherein the communication is a PUSCH transmission or a PUCCH transmission; the transmission parameter includes a transmit power of the PUSCH transmission or the PUCCH transmission; and the SRS parameter includes a transmit power of the SRS transmission that is related to the transmit power of the PUSCH transmission or the PUCCH transmission, respectively.

Aspect 26: The method of any of aspect 15, and 19-25, wherein the SRS resource is an aperiodic resource and the triggering message is a downlink control information (DCI) transmission or a medium access control (MAC)-control element (CE) transmission.

Aspect 27: The method of any of aspects 15-26, wherein the SRS parameter being related to the triggering message includes (i) a bandwidth of the SRS transmission being related to a bandwidth of the triggering message; a timing offset of the SRS transmission being related to a timing parameter of the triggering message; or (iii) a QCL relationship indication of the SRS transmission being related to a QCL relationship indication of the triggering message.

Aspect 28: The method of any of aspect 15, and 19-25, wherein the SRS resource is a periodic resource.

Aspect 29: A base station (BS), comprising: a memory; a processor coupled to the memory and configured to, when executing instructions stored on the memory, to cause the BS to perform the methods of aspects 1-14.

Aspect 30: A user equipment (UE), comprising: a memory; a processor coupled to the memory; and a transceiver coupled to the processor and configured to perform the methods of aspects 15-28.

Aspect 31: A base station (BS) comprising means for performing the methods of aspects 1-14.

Aspect 32: A user equipment (UE) comprising means for performing the methods of aspects 15-28.

Aspect 33: A non-transitory computer-readable medium (CRM) having program code recorded thereon, the program code comprises code for causing a BS to perform the methods of aspects 1-14.

Aspect 34: A non-transitory computer-readable medium (CRM) having program code recorded thereon, the program code comprises code for causing a UE to perform the methods of aspects 15-28.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication performed by a base station (BS), the method comprising:
measuring a sounding reference signal (SRS) transmission transmitted by a user equipment (UE) using a SRS resource, the SRS transmission having a SRS parameter that is (i) indicated in or related to a triggering message, or (ii) related to a transmission parameter of a communication between the BS and the UE, wherein the SRS parameter is related to the transmission parameter of the communication via a RRC configuration message from the BS, wherein the triggering message is configured to override a relationship between the SRS parameter and the transmission parameter; and
receiving, using a receive beam selected based on the measuring, a transmission from the UE.

2. The method of claim 1, wherein:
the communication is a physical uplink shared channel (PUSCH) transmission or a physical uplink control channel (PUCCH) transmission; the transmission parameter is a bandwidth of the PUSCH transmission or the PUCCH transmission; and the SRS parameter is a bandwidth of the SRS transmission that is related to the bandwidth of the PUSCH transmission or the PUCCH transmission, respectively.

3. The method of claim 1, wherein:
the communication is a PUSCH transmission or a PUCCH transmission; the transmission parameter is a timing parameter of the PUSCH transmission or the PUCCH transmission; and the SRS parameter is a timing offset of the SRS transmission that is related to the timing parameter of the PUSCH transmission or the PUCCH transmission, respectively.

4. The method of claim 1, wherein:
the communication is a PUSCH transmission or a PUCCH transmission; the transmission parameter is a QCL indication of the PUSCH transmission or the PUCCH transmission; and the SRS parameter is a QCL indication of the SRS transmission that is related to the QCL indication of the PUSCH transmission or the PUCCH transmission, respectively.

5. The method of claim 1, wherein:
the communication is a PUSCH transmission or a PUCCH transmission; the transmission parameter is a transmit power of the PUSCH transmission or the PUCCH transmission; and the SRS parameter is a transmit power of the SRS transmission that is related to the transmit power of the PUSCH transmission or the PUCCH transmission, respectively.

6. The method of claim 1, wherein the SRS resource is an aperiodic resource and the triggering message is a downlink control information (DCI) transmission or a medium access control (MAC)-control element (CE) transmission.

7. The method of claim 1, wherein the SRS parameter being related to the triggering message includes (i) a bandwidth of the SRS transmission being related to a bandwidth of the triggering message; a timing offset of the SRS transmission being related to a timing parameter of the triggering message; or (iii) a QCL relationship indication of the SRS transmission being related to a QCL relationship indication of the triggering message.

8. The method of claim 1, wherein the SRS resource is a periodic resource.

9. A method of wireless communication performed by a user equipment (UE), the method comprising:
transmitting, to a base station (BS), a sounding reference signal (SRS) transmission using a SRS resource and having a SRS parameter that is (i) indicated in or related to a triggering message, or (ii) related to a transmission parameter of a communication between the UE and the BS, wherein the SRS parameter is related to the transmission parameter of the communication via a RRC configuration message from the BS, wherein the triggering message is configured to override a relationship between the SRS parameter and the transmission parameter; and
receiving, from the BS, a downlink control information (DCI) message including a SRS resource indicator (SRI) for use by the UE in selecting a beam to transmit to the BS.

10. The method of claim 9, wherein:
the communication is a physical downlink shared channel (PDSCH) transmission or a physical downlink control channel (PDCCH) transmission; the transmission parameter is a bandwidth of the PDSCH transmission or the PDCCH transmission; and the SRS parameter is a bandwidth of the SRS transmission that is related to the bandwidth of the PDSCH transmission or the PDCCH transmission, respectively.

11. The method of claim 9, wherein:
the communication is a PDSCH transmission or a PDCCH transmission; the transmission parameter is a timing parameter of the PDSCH transmission or the PDCCH transmission; and the SRS parameter is a timing offset of the SRS transmission that is related to the timing parameter of the PDSCH transmission or the PDCCH transmission, respectively.

12. The method of claim 9, wherein:
the communication is a PDSCH transmission or a PDCCH transmission; the transmission parameter is a QCL relationship indication of the PDSCH transmission or the PDCCH transmission; and the SRS parameter is a QCL relationship indication of the SRS transmission that is related to the QCL indication of the PDSCH transmission or PDCCH transmission, respectively.

13. The method of claim 9, wherein a switching delay between the SRS transmission and the communication is configured via a radio resource control (RRC) message from the BS.

14. A base station (BS), comprising:
a memory;
a processor coupled to the memory and configured to, when executing instructions stored on the memory, to cause the BS to:
measure a sounding reference signal (SRS) transmission transmitted by a user equipment (UE) using a SRS resource, the SRS transmission having a SRS parameter that is (i) indicated in or related to a triggering message, or (ii) related to a transmission parameter of a communication between the BS and the UE, wherein the SRS parameter is related to the transmission parameter of the communication via a RRC configuration message from the BS, wherein the triggering message is configured to override a relationship between the SRS parameter and the transmission parameter; and
receive, using a receive beam selected based on the measuring, a transmission from the UE.

15. The BS of claim 14, wherein:
the communication is a physical downlink shared channel (PDSCH) transmission or a physical downlink control channel (PDCCH) transmission; the transmission parameter is a bandwidth of the PDSCH transmission or the PDCCH transmission; and the SRS parameter is a bandwidth of the SRS transmission that is related to the bandwidth of the PDSCH transmission or the PDCCH transmission, respectively.

16. The BS of claim 14, wherein:
the communication is a PDSCH transmission or a PDCCH transmission; the transmission parameter is a timing parameter of the PDSCH transmission or the PDCCH transmission; and the SRS parameter is a timing offset of the SRS transmission that is related to the timing parameter of the PDSCH transmission or the PDCCH transmission, respectively.

17. The BS of claim 14, wherein:
the communication is a PDSCH transmission or a PDCCH transmission; the transmission parameter is a QCL relationship indication of the PDSCH transmission or the PDCCH transmission; and the SRS parameter is a QCL relationship indication of the SRS transmission that is related to the QCL indication of the PDSCH transmission or PDCCH transmission, respectively.

18. The BS of claim 14, wherein a switching delay between the SRS transmission and the communication is configured via a radio resource control (RRC) message from the BS.

19. A user equipment (UE), comprising:
a memory;
a processor coupled to the memory; and
a transceiver coupled to the processor and configured to:
   transmit a sounding reference signal (SRS) transmission using a SRS resource and having a SRS parameter that is (i) indicated in or related to a triggering message, or (ii) related to a transmission parameter of a communication between the UE and the BS, wherein the SRS parameter is related to the transmission parameter of the communication via a RRC configuration message from the BS, wherein the triggering message is configured to override a relationship between the SRS parameter and the transmission parameter; and
   receive, from the BS, a downlink control information (DCI) message including a SRS resource indicator (SRI) for use by the UE in selecting a beam to transmit to the BS.

20. The UE of claim 19, wherein:
the communication is a physical uplink shared channel (PUSCH) transmission or a physical uplink control channel (PUCCH) transmission; the transmission parameter is a bandwidth of the PUSCH transmission or the PUCCH transmission; and the SRS parameter is a bandwidth of the SRS transmission that is related to the bandwidth of the PUSCH transmission or the PUCCH transmission, respectively.

21. The UE of claim 19, wherein:
the communication is a PUSCH transmission or a PUCCH transmission; the transmission parameter is a timing parameter of the PUSCH transmission or the PUCCH transmission; and the SRS parameter is a timing offset of the SRS transmission that is related to the timing parameter of the PUSCH transmission or the PUCCH transmission, respectively.

22. The UE of claim 19, wherein:
the communication is a PUSCH transmission or a PUCCH transmission; the transmission parameter is a QCL indication of the PUSCH transmission or the PUCCH transmission; and the SRS parameter is a QCL indication of the SRS transmission that is related to the QCL indication of the PUSCH transmission or the PUCCH transmission, respectively.

23. The UE of claim 19, wherein:
the communication is a PUSCH transmission or a PUCCH transmission; the transmission parameter is a transmit power of the PUSCH transmission or the PUCCH transmission; and the SRS parameter is a transmit power of the SRS transmission that is related to the transmit power of the PUSCH transmission or the PUCCH transmission, respectively.

24. The UE of claim 19, wherein the SRS resource is an aperiodic resource and the triggering message is a downlink control information (DCI) transmission or a medium access control (MAC)-control element (CE) transmission.

25. The UE of claim 19, wherein the SRS parameter being related to the triggering message includes (i) a bandwidth of the SRS transmission being related to a bandwidth of the triggering message; a timing offset of the SRS transmission being related to a timing parameter of the triggering message; or (iii) a QCL relationship indication of the SRS transmission being related to a QCL relationship indication of the triggering message.

26. The UE of claim 19, wherein the SRS resource is a periodic resource.

* * * * *